(12) United States Patent
Scott et al.

(10) Patent No.: US 12,534,868 B2
(45) Date of Patent: Jan. 27, 2026

(54) MONITORING SYSTEM FOR A RADON MITIGATION SYSTEM

(71) Applicant: EsenselQ, LLC, Troy, MI (US)

(72) Inventors: Nara Gasparian Scott, Bloomfield Hills, MI (US); David Scott, Bloomfield Hills, MI (US); Emilie Scott, Bloomfield Hills, MI (US)

(*) Notice: Subject to any disclaimer, the term of this patent is extended or adjusted under 35 U.S.C. 154(b) by 191 days.

(21) Appl. No.: 18/409,205

(22) Filed: Jan. 10, 2024

(65) Prior Publication Data
US 2024/0150991 A1   May 9, 2024

Related U.S. Application Data

(63) Continuation-in-part of application No. 17/496,131, filed on Oct. 7, 2021, now Pat. No. 12,241,802.

(60) Provisional application No. 63/438,730, filed on Jan. 12, 2023, provisional application No. 63/111,475, filed on Nov. 9, 2020.

(51) Int. Cl.
| | |
|---|---|
| *E02D 31/00* | (2006.01) |
| *F24F 11/00* | (2018.01) |
| *F24F 11/38* | (2018.01) |
| *F24F 11/52* | (2018.01) |
| *F24F 110/68* | (2018.01) |

(52) U.S. Cl.
CPC ........ *E02D 31/008* (2013.01); *F24F 11/0001* (2013.01); *F24F 11/38* (2018.01); *F24F 11/52* (2018.01); *F24F 2110/68* (2018.01)

(58) Field of Classification Search
CPC ......... E02D 31/008; F24F 11/38; F24F 11/52; F24F 11/0001; F24F 110/68

USPC ......................................................... 340/605
See application file for complete search history.

(56) References Cited

U.S. PATENT DOCUMENTS

| | | |
|---|---|---|
| 3,176,503 A | 4/1965 | Robinson |
| 6,110,038 A | 8/2000 | Stern |
| 6,535,123 B2 | 3/2003 | Sandelman et al. |
| 7,414,525 B2 | 8/2008 | Costea et al. |
| 8,147,302 B2 | 4/2012 | Desrochers et al. |
| (Continued) | | |

FOREIGN PATENT DOCUMENTS

| | | |
|---|---|---|
| AU | 2011226785 A1 | 4/2013 |
| DE | 19936893 A1 | 2/2001 |
| WO | WO-2017173463 A1 | 10/2017 |

OTHER PUBLICATIONS

Product Bulletin (Aug. 2019)(3) (003).
VaporTrac VT-03 User's Manual (REV 9_Vrs 2.1) (003).

*Primary Examiner* — Kerri L McNally
(74) *Attorney, Agent, or Firm* — Harness, Dickey & Pierce, P.L.C.

(57) ABSTRACT

A method and system for monitoring using a sub-slab sensor assembly for a building having a slab includes a housing, a first air quality sensor coupled to the housing and generating a first air quality signal for air above the slab, a second air quality sensor coupled to the housing and generating a second air quality signal for air below the slab and a pressure sensor coupled to the housing. The pressure sensor generates a pressure signal corresponding to the pressure below the slab. A position sensor generates a position signal corresponding to a location of the sensor. A network interface communicates the first air quality signal, the second air quality signal or the pressure signal, or warning signals corresponding thereto and the position signal to a network.

21 Claims, 31 Drawing Sheets

(56) References Cited

U.S. PATENT DOCUMENTS

| | | | |
|---|---|---|---|
| 8,350,710 B2 * | 1/2013 | Logan | G08B 25/08 |
| | | | 340/602 |
| 8,839,592 B2 | 9/2014 | Foran | |
| 8,902,071 B2 | 12/2014 | Barton et al. | |
| 8,939,825 B2 | 1/2015 | Hatton et al. | |
| 9,007,224 B1 | 4/2015 | Fadell et al. | |
| 9,157,651 B2 | 10/2015 | Hatton et al. | |
| 9,927,535 B2 | 3/2018 | Rodell | |
| 10,480,803 B2 | 11/2019 | Hatton et al. | |
| 10,529,215 B2 | 1/2020 | Brown | |
| 11,138,860 B2 | 10/2021 | Brown | |
| 11,739,961 B2 | 8/2023 | Hatton et al. | |
| 2005/0103874 A1 | 5/2005 | Erdman | |
| 2005/0225441 A1 | 10/2005 | Kernan | |
| 2006/0234621 A1 | 10/2006 | Desrochers et al. | |
| 2007/0131864 A1 | 6/2007 | Ellis et al. | |
| 2008/0310967 A1 | 12/2008 | Franz et al. | |
| 2009/0045925 A1 * | 2/2009 | Demin | B67D 7/3236 |
| | | | 340/12.32 |
| 2009/0240377 A1 | 9/2009 | Batzler et al. | |
| 2010/0105311 A1 | 4/2010 | Meneely, Jr. | |
| 2010/0291850 A1 | 11/2010 | Sabbaghian et al. | |
| 2012/0328378 A1 | 12/2012 | Hatton et al. | |
| 2013/0295837 A1 | 11/2013 | Bailey | |
| 2013/0331021 A1 * | 12/2013 | Rodell | F24F 11/0001 |
| | | | 250/336.1 |
| 2014/0252099 A1 | 9/2014 | Hatton et al. | |
| 2014/0300489 A1 | 10/2014 | Rice | |
| 2021/0223411 A1 * | 7/2021 | Thornberry | H01J 47/02 |
| 2022/0270463 A1 | 8/2022 | Brown | |

\* cited by examiner

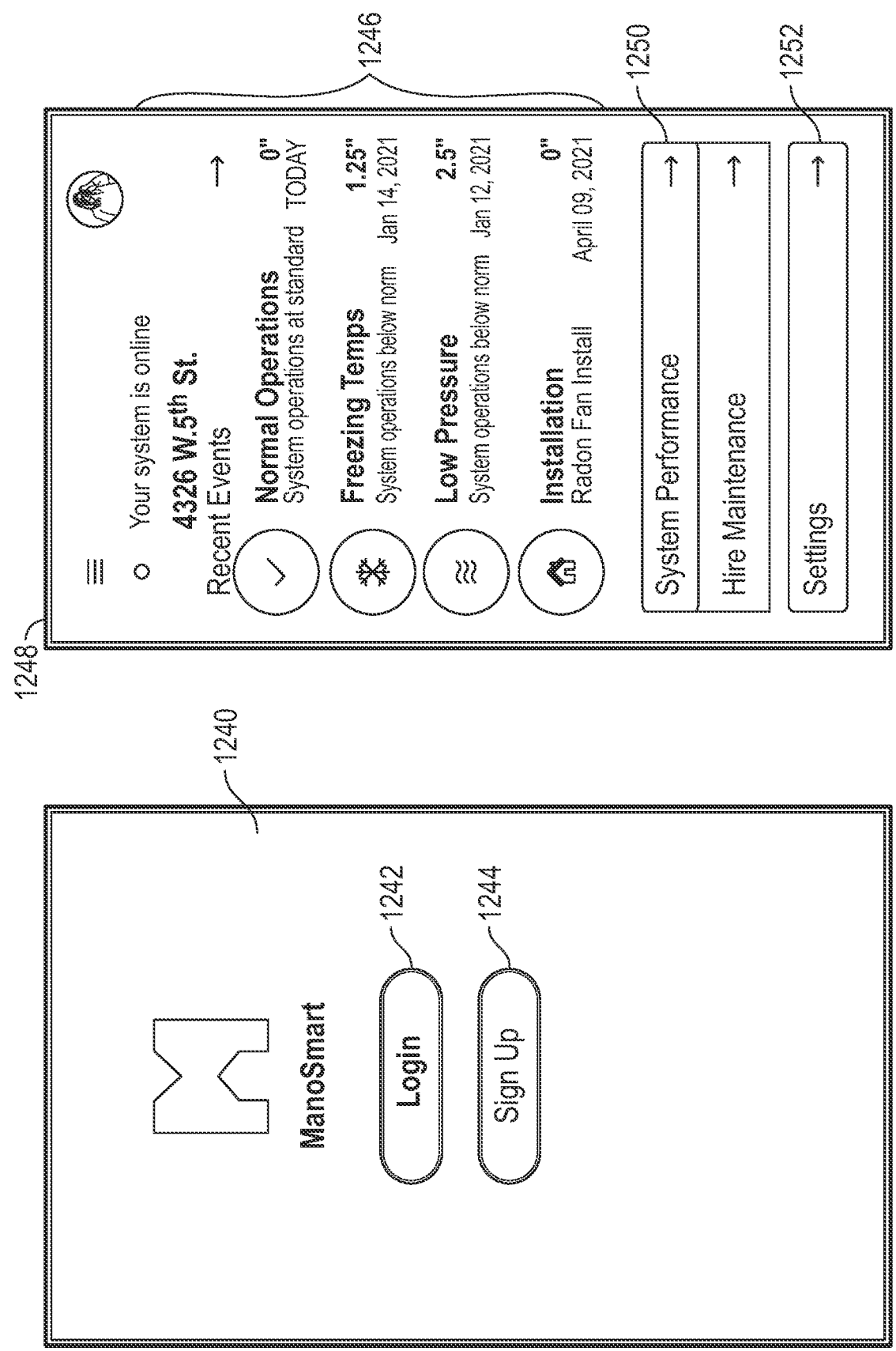

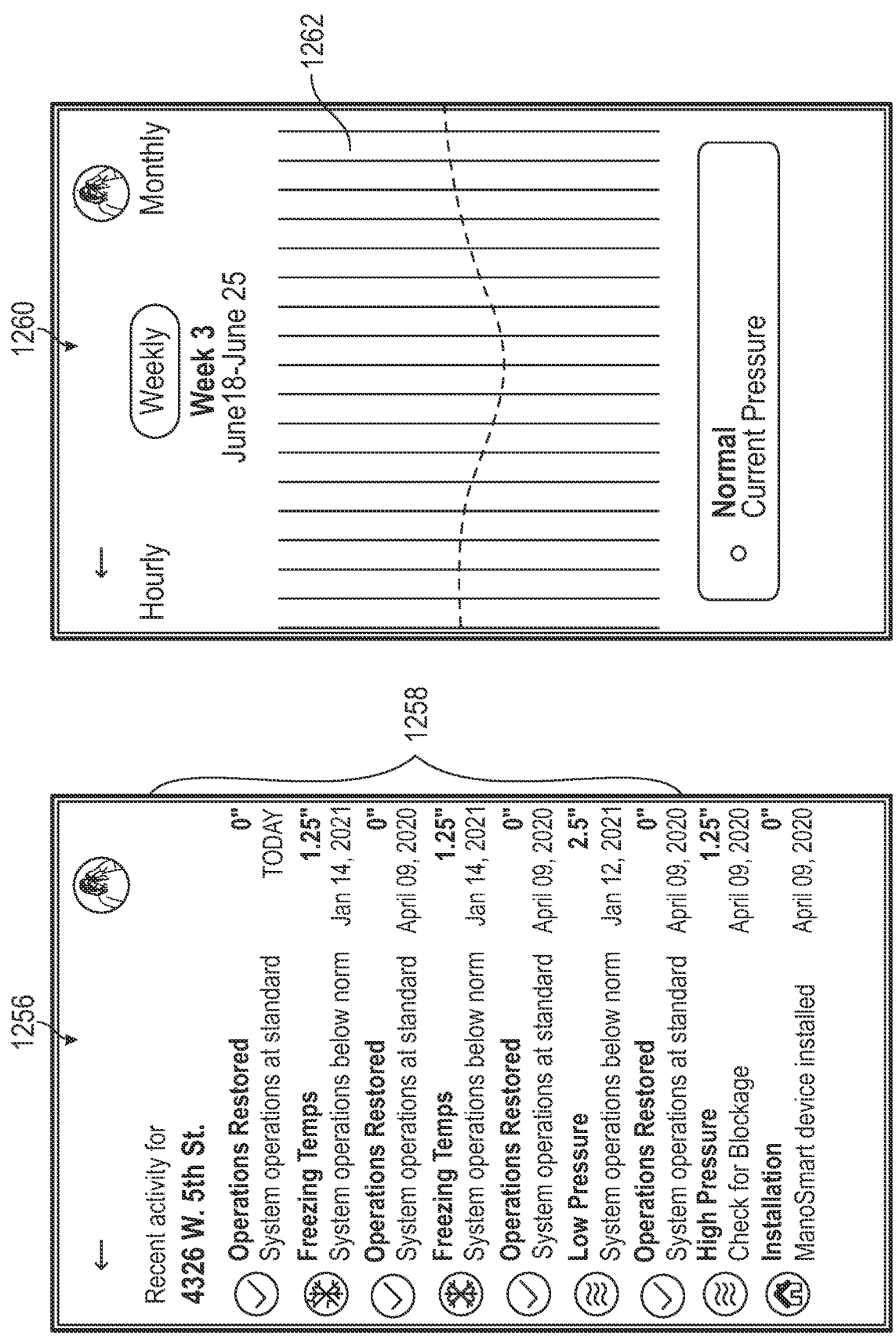

MONITORING SYSTEM FOR A RADON MITIGATION SYSTEM

CROSS-REFERENCE TO RELATED APPLICATIONS

This application is a non-provisional of 63/438,730 filed Jan. 12, 2023, and is a continuation-in-part of U.S. Ser. No. 17/496,131, filed Oct. 7, 2021, which claims priority to U.S. Ser. No. 63/111,475, filed on Nov. 9, 2020. The entire disclosures of each of the above applications are incorporated herein by reference.

FIELD

The present disclosure relates generally to radon mitigation systems and, more particularly, to a system for monitoring the operation of fan depressurization in mitigating entry of radon gas into indoor environments.

BACKGROUND

Exposure to radon gas over a long period of time increases the likelihood of developing lung cancer among both smokers and non-smokers. Exposure to other contaminants also increases other medical risks.

Mitigation systems are installed to remove radon and other contaminants from indoor environments. The mitigation fan creates negative pressure beneath the building slab then uses a piping system to exhaust contaminating gases into open air.

SUMMARY

The present disclosure provides a useful monitoring system for determining whether a radon mitigation system is operating properly or at all. Some features include a manometer deployed in the system for visual monitoring. The manometer is physically deployed within a housing and may have an electrical sensor for sensing the liquid level of the manometer. Another pressure sensor in addition to or instead of the manometer pressure sensor is coupled to the exhaust pipe between the sub-slab area and the exhaust fan. Other useful features are delayed notifications to prevent spurious warnings, a mute mode for silencing the alarm temporarily, monitoring feature for communicating warnings to a monitoring site, user device, an Internet-of-things (IOT) device and an application for a user device for receiving and warning of conditions wirelessly.

This is a unique two-in-one device that combines pressure gauge and a transducer to include tracking with Bluetooth connection with an option to have an alert for when radon level goes above 4 pCi/L.

The tracking system will also produce data for radon fan suppliers and manufacturers to optimize for upstream demand when data signals indicate the system is failing.

The system communicates an alert to radon mitigators if the fan is not working. This allows the mitigators to send out technicians to replace the fan so the system will be working as intended.

This can be applied to another device that will track water pressure in pipes and gas pipes. Acknowledging the progression of extreme weather cases, water-column measurement can be effective in preventing damage to homes and businesses with proactive drainage systems in the case of a flood.

In one aspect of the disclosure, a system for monitoring pressure within a volume defined by a wall has a housing and a manometer coupled to the housing having fluid therein. The manometer is coupled to the volume and has a fluid level corresponding to a pressure within the volume. A pressure sensor is coupled to the housing and is coupled to volume. The pressure sensor generates a pressure signal corresponding to the pressure within the volume. A controller is coupled to the pressure sensor and is programmed to compare the pressure signal to a threshold and programmed to generate an indicator based on comparison.

In another aspect of the disclosure, a method and system for monitoring using a sub-slab sensor assembly for a building having a slab includes a housing, a first air quality sensor coupled to the housing and generating a first air quality signal for air above the slab, a second air quality sensor coupled to the housing and generating a second air quality signal for air below the slab and a pressure sensor coupled to the housing. The pressure sensor generates a pressure signal corresponding to the pressure below the slab. A position sensor generates a position signal corresponding to a location of the sensor. A network interface communicates the first air quality signal, the second air quality signal or the pressure signal, or warning signals corresponding thereto and the position signal to a network.

In yet another aspect of the disclosure, a method of operating a sub-slab monitoring system includes generating a first air quality signal for air above the slab from a first air quality sensor coupled to a housing, generating a second air quality signal for air below the slab from a second air quality sensor coupled to the housing, generating a pressure signal corresponding to the air pressure below the slab, generating a position signal corresponding to a location of the housing and communicating the first air quality signal, the second air quality signal, the pressure signal and the position signal to a network through a network interface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 12C is a login screen for the application of the system.

FIG. 12D is a screen display of operational data from the application of the system.

FIG. 12E is a second example of a screen display of operational data from the application of the system.

FIG. 12F is a graph of operational data from the application of the system.

DETAILED DESCRIPTION

Example embodiments will now be described more fully with reference to the accompanying drawings.

Figure 1A:
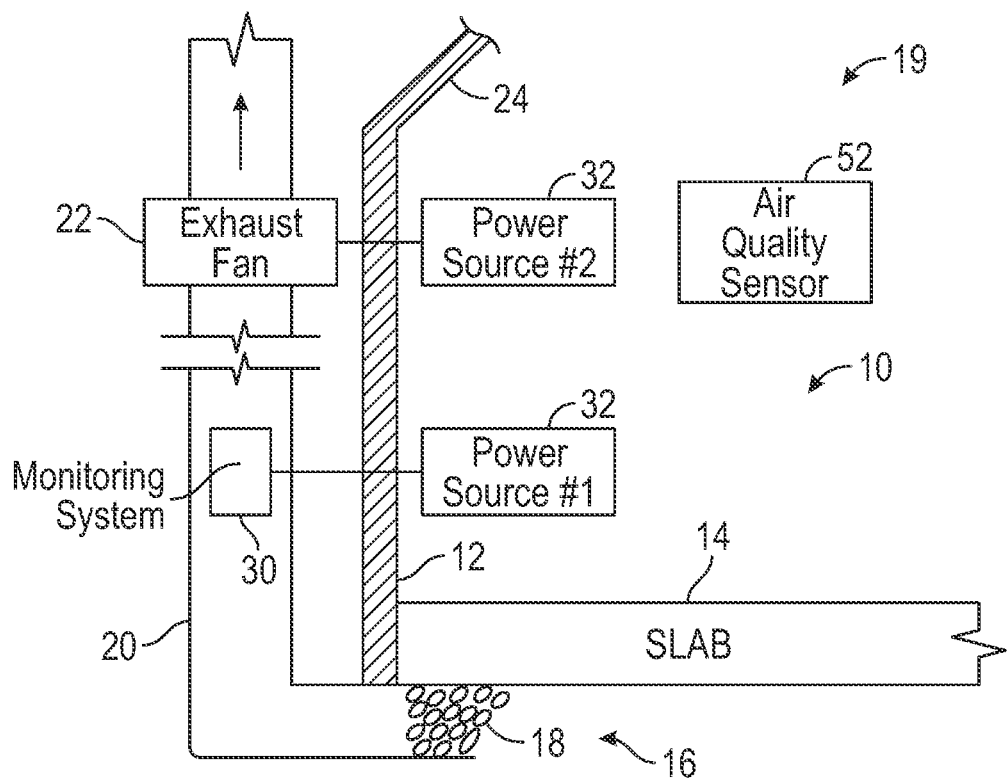
FIG. 1A is a block diagrammatic view of a monitoring system coupled to a vapor mitigation system.

Referring now to FIG. 1A, a building 10 has a wall 12 and a slab 14. The slab 14 has a sub-slab area 16 that has soil or stone 18 disposed therein. A mitigation system 19 has an exhaust pipe 20 that has an exhaust fan 22 that is used to create a negative pressure in the sub-slab area 16. The exhaust fan 22 draws air from the sub-slab area 16 with the first portion 20A of the pipe. A second portion 22B of the exhaust pipe 20 extends from the exhaust fan 22 upward to a safe height. Commonly, the exhaust fan 22 is located in a high location such as at or near a roof 24.

As mentioned above, it is important to ensure that the exhaust fan 22 is operating to draw vapors from the sub-slab area 16. A monitoring system 30 is illustrated coupled to the exhaust pipe 20 in FIG. 1A. The monitoring system 30 is coupled to a first power source 32. The first power source 32 may be a building power circuit. However, other types of power sources may be provided such as a solar power source located on the exterior of the building 10. The exhaust fan 22 is coupled to a second power source 34 different from the first power source 32. The monitoring system 30 monitors the pressure within the exhaust pipe 20 and provides an indication thereof at the monitoring system 30. Details of the monitoring system 30 are provided below. The monitoring system 30 of FIG. 1A is mounted directly to the exhaust pipe 20. Mounting may use tie wraps, fasteners, adhesive, adhesive pads, two-way tape and the like. An opening 38 in the exhaust pipe 20 is hidden by the monitoring system 30 in FIG. 1A but is illustrated in FIG. 1B.

Figure 1B:
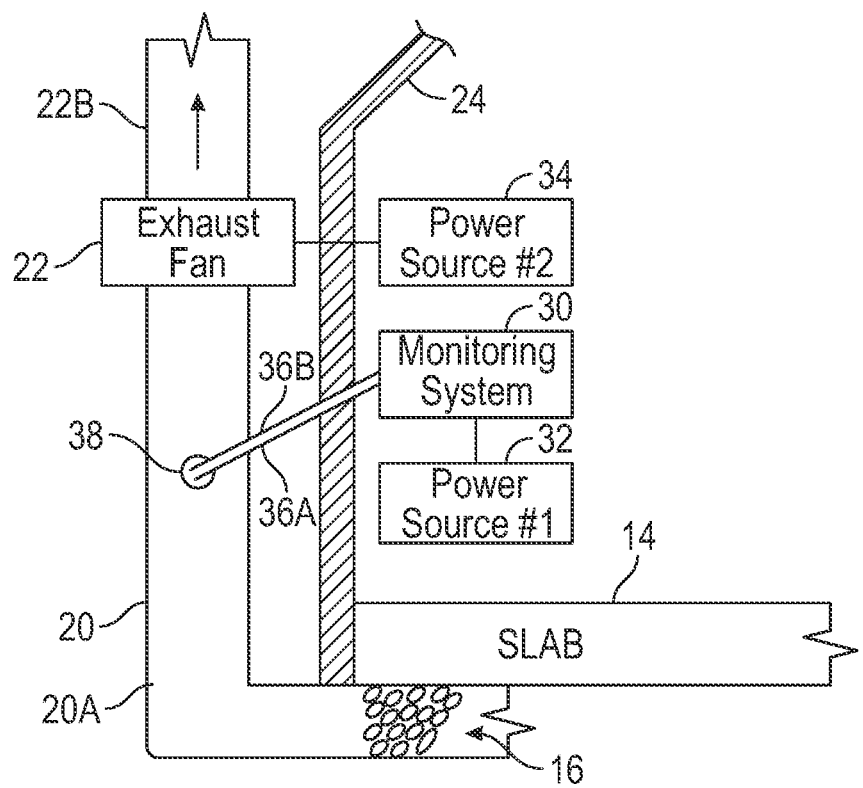
FIG. 1B is a second example of a monitoring system coupled to a mitigation system.

Referring now to FIG. 1B, the monitoring system 30 is coupled by a first conduit 36A and a second conduit 36B to an opening 38 in the exhaust pipe 20. The conduits 36A, 36B may be disposed within a single or common outer sheath. Further, a separate conduit 36C may also be included in the common outer sheath and communicate air from the exhaust pipe 20 to a chemical sensor 70 in the sensing system as described below.

Figure 1D:
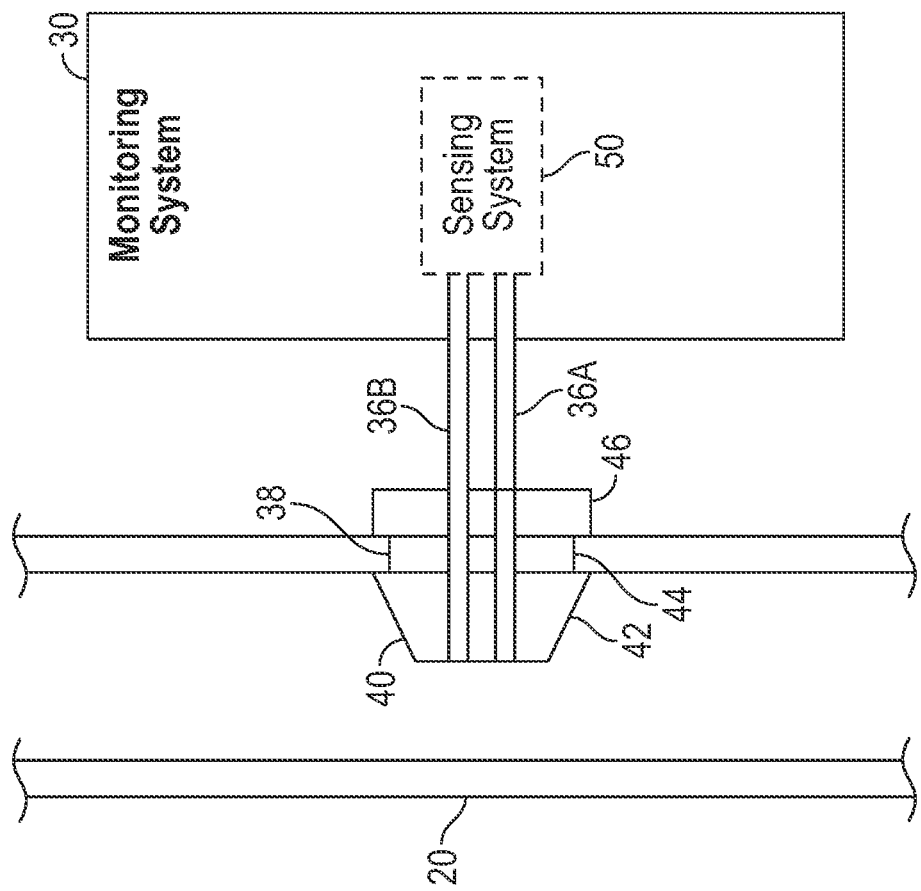
FIG. 1D is a cutaway view of the system of FIG. 1B.
Figure 1C:
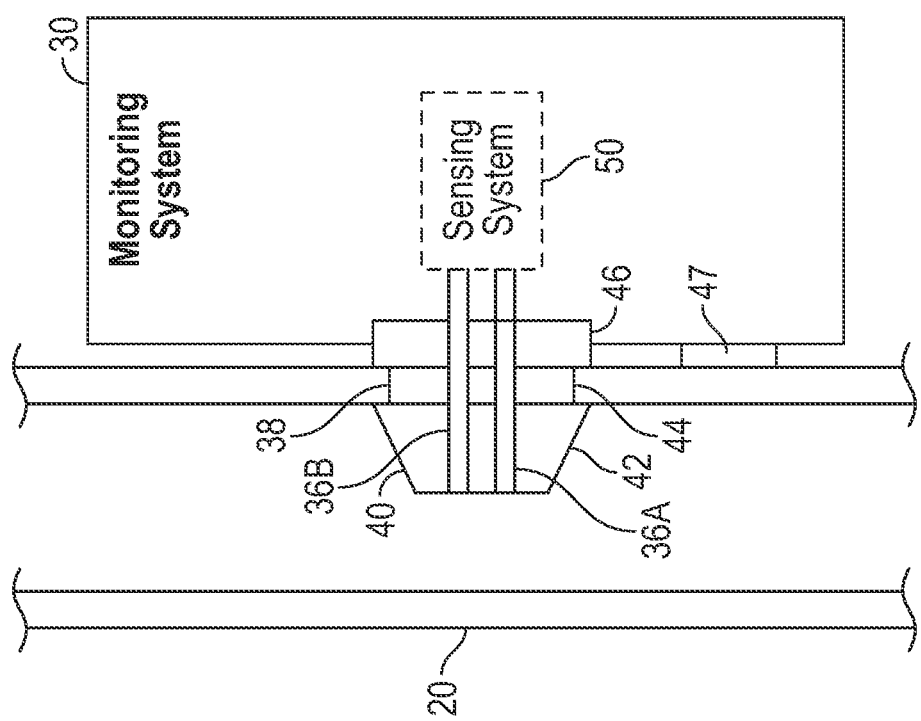
FIG. 1C is a cutaway view of the system of FIG. 1A.

Referring now to FIGS. 1C and 1D, the pipe 20 is illustrated having a grommet 40 coupled thereto. The grommet 40 holds the open end of the conduits 36A, 36B, 36C within the pipe to expose the pressure within the exhaust pipe 20 to the monitoring system 30 and, more specifically, to the sensing system 50. The seal or grommet 40 is formed from a material and sized to seal the opening 38 formed in the exhaust pipe 20 such as but not limited to neoprene, polyurethane foam and nitrile rubber. In this example, a grommet 40 has a tapered or sloped surface 42 with a diameter smaller than the opening to assist in the insertion of the grommet 40 within the opening 38. A reduced diameter portion 44 is directly adjacent to the opening 38. An enlarged portion 46 remains exterior to the exhaust pipe 20. Tape 47 or another adhesive may be used to secure or help secure the monitoring system to the pipe 20. One example of tape 2047 is two-way tape. Command® brand tape strips are also suitable.

The sensing system 50 provides visual, audible or both relative to the pressure or chemical concentration, or both within the exhaust pipe 20.

One or more air quality sensors 52 may be disposed of in the building. The air quality sensor 52 may communicate an air quality signal to the monitoring system 30. The monitoring system 30 may communicate the air quality signal to the user device 80 or the central monitoring system in FIG. 2. The air quality signal may correspond to but not limited to mold, carbon monoxide, smoke, radon, natural gas, ozone, oxides of nitrogen, humidity, temperature or the like.

Figure 2:
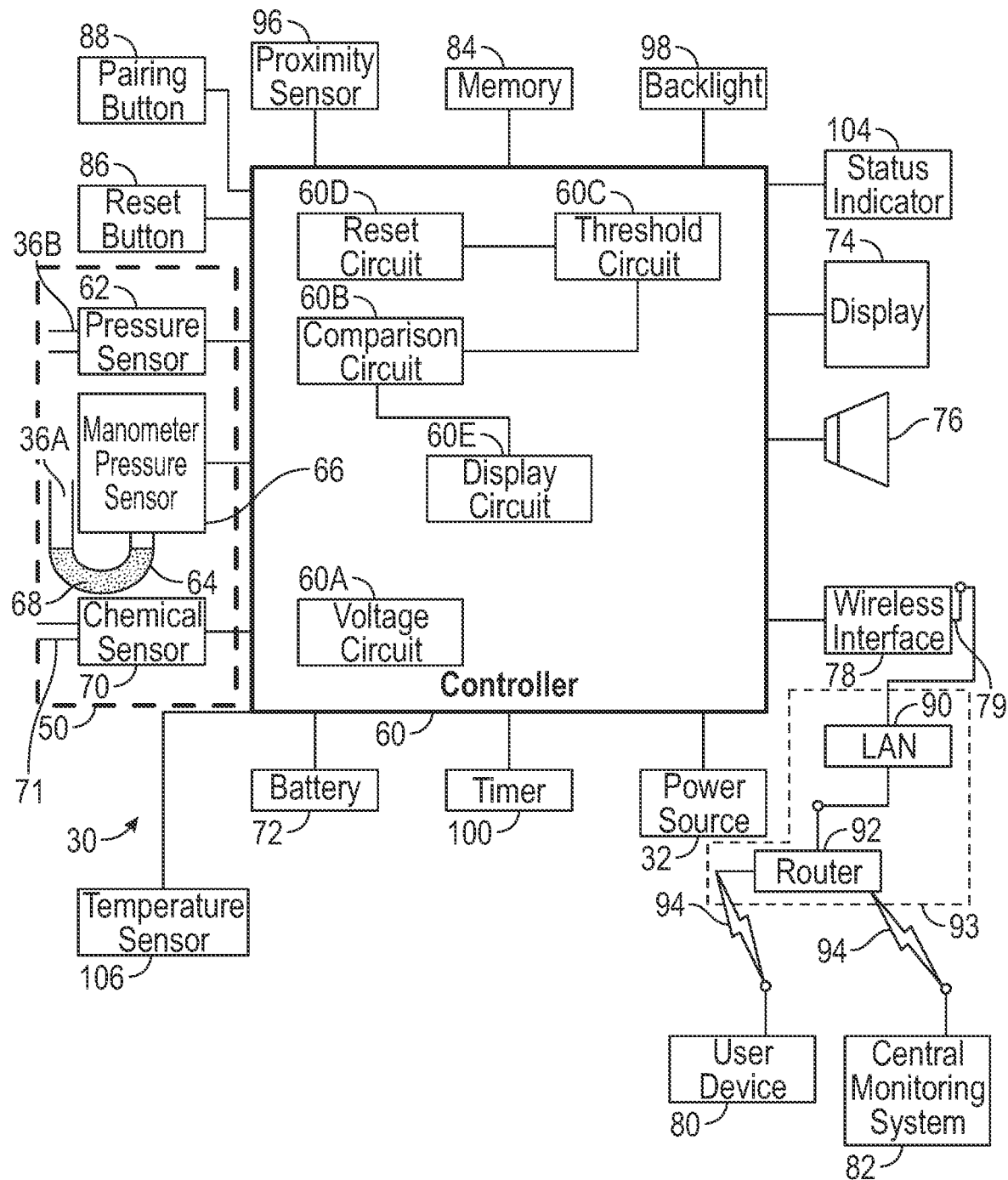
FIG. 2 is a block diagrammatic view of the monitoring system.
Figure 3A:
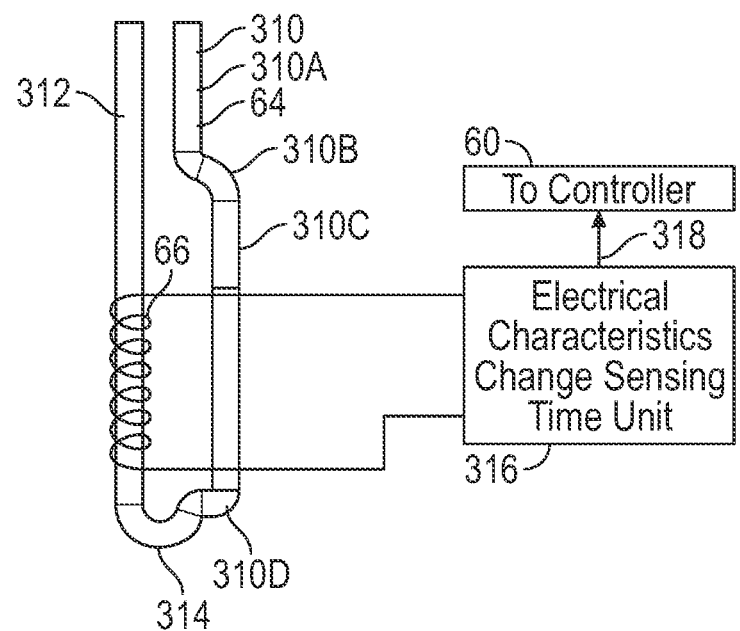
FIG. 3A is a side view of a first example of a manometer for the monitoring system.
Figure 3B:
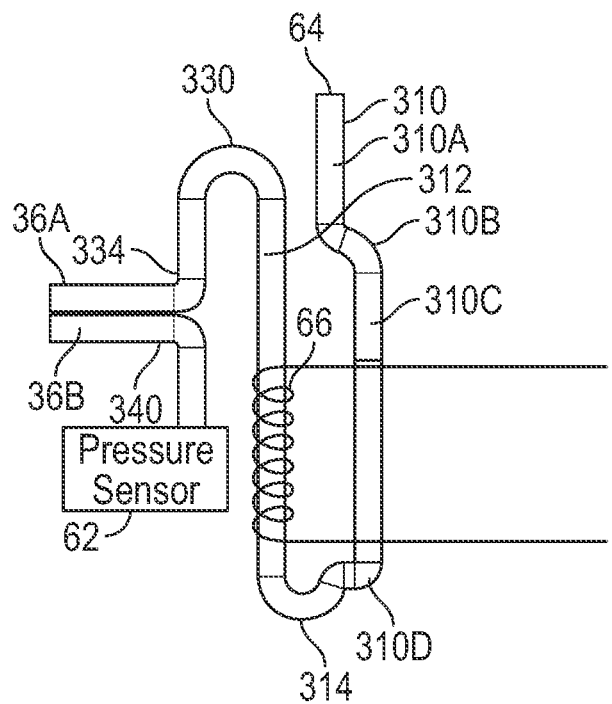
FIG. 3B is a side view of a second example of a manometer for the monitoring system.

Referring now to FIGS. 2, 3A and 3B, the monitoring system 30 has the sensing system 50 coupled to a controller 60. The sensing system 50 is coupled to a pressure sensor 62. The pressure sensor 62 is coupled to one of the conduits 36A, 36B and generates a pressure signal corresponding thereto. The other conduit 36A, 36B is coupled to a manometer 64. The manometer 64 may also have a manometer pressure sensor 66 coupled thereto. The manometer pressure sensor 66 is optional. The manometer 64, as will be described below, provides a visual indication of the pressure within the exhaust pipe 20 based on the level of fluid 68 in the manometer 64. To enhance the fluid level, coloring may be added thereto. The manometer pressure sensor 66 may sense an electrical condition relative to the fluid 68 within the manometer 64. That is, when the level of fluid 68 changes within the manometer 64 to be adjacent to or not adjacent to the manometer pressure sensor 66, the electrical condition such as the capacitance or inductance of the fluid may change. Various types of manometer pressure sensors may be used depending upon the particular electrical characteristic to be measured.

The chemical sensor 70 may also be coupled to the controller 60. The chemical sensor 70 may sense one or more chemicals of interest and generate an electrical signal corresponding to the concentration of the sensed chemical or chemicals (a chemical concentration signal) in the exhaust pipe 20. Chemicals may include but are not limited to radon, arsenic, hydrogen sulfides, petroleum, methane, and agricultural chemicals such as pesticides or herbicides. The conduit 36C may be used to separately communicate air within the exhaust pipe 20 to the sensor 70. However, one of the other conduits may be shared by the chemical sensor 70.

The controller 60 is coupled to the first power source 32, which may be an AC power source, or an AC power source coupled to an AC to DC converter. A battery 72 is also coupled to the controller 60 to power the system instead of the first power source 32 or a backup to the first power source 32. The battery 72 may include a rechargeable lithium-ion battery that is recharged by the first power source 32. The life of the battery backup 72 may vary depending upon the design characteristics. The battery backup 72 is used by the controller 60 to operate the system for several hours, days or weeks.

The controller 60 is also coupled to a display 74 and a speaker 76, which is used to audibly display warnings and alarms, and a wireless interface 78 and an antenna 79 are used to wireless communicate signals such as status signals to an application on a user device 80 or a central monitoring system 82. The wireless interface 78 may be two-way so that control of alarms from an application may be performed. The display may be LEDs, OLEDs, an LCD or the like. Alarms, status signals and no power or low power signals may be generated from the wireless interface 78 and communicated to the user device 80 or the central monitoring system 82 to provide warnings to the user. A memory 84 is used to store various items such as the thresholds to trigger warnings based upon the comparison with the signals from the pressure sensors 62, 66. A reset button 86 may have several purposes including the resetting of the thresholds mentioned above.

The controller 60 has a plurality of internal circuits that are used to control various functions. The controller 60 has a voltage circuit 60A that is used to compare the voltage from the battery 72 or the power source 32 or both to the threshold. In one example, the voltage circuit 60A determines whether power from the power source 32 is being provided from the controller 60. In another example, the battery charge level of the battery 72 is determined. The voltage circuit 60A may trigger an alarm indicator or generate a wireless signal when the state of charge or voltage level drops below a predetermined voltage threshold such as 50%. Depending on the size of the battery, this may allow an adequate time so a technician can be dispatched. A warning indicator in the form of an audio signal communicated by the speaker 76 or a visual indicator signal communicated by the display 74 may be used to indicate the voltage is low or below a threshold. The wireless interface 78 may also communicate to the user device 80 or the central monitoring system 82 that the voltage is low. The voltage circuit 60A may communicate that the voltage has been interrupted from the power source 32 after a predetermined amount of time so that extraneous or very short power outages do not trigger such a warning. The voltage circuit 60A may also control the charging of the battery 72. That is, the battery 72 may be a rechargeable battery which is charged and maintained at a certain level so that if external power to the monitoring system 30 is interrupted the monitoring system can be powered by the battery 72.

The controller 60 also comprises a comparison circuit 60B. The comparison circuit 60B compares the pressure signal from the pressure sensor 62 or the pressure sensor 66 to one or more pressure thresholds. The pressure thresholds may be preset and stored in memory 84 upon delivery of the device. In fact, more than one, such as two thresholds, a high threshold and a low threshold, may be set within the memory 84. Thus, the high threshold and the low threshold provide an operating range for normal operation of the device. Normal operation of the device may be displayed through the display 74 and may also be indicated visually by the manometer 64. The multiple segments of the display may be illuminated according to the pressure proportionally, so an indication of pressure is displayed. The comparison circuit 60B uses the thresholds and the threshold circuits 60C for the comparison. As mentioned above, the reset button 86 may be used to reset the thresholds used by the threshold circuit 60C. The reset circuit 60D may set the high threshold to a different value. This is useful when the operating conditions change such as the type of soil or under slab conditions may require a higher operating range.

The reset button 86 may also be used to mute the audible signal when operating or illuminate a sleeping display for a predetermined amount of time. The reset circuit 60D may only allow a predetermined number of resets before continually activating an audible signal.

The reset button 86 may perform various functions. When the reset button 86 is held for 3 seconds after start up (power applied), connection to the internet may be established. Once connected to the internet the status indicator 104 may be solid. The whole system may be reset by holding the reset button 86 for 5 seconds, as another example.

As part of the sensing, a temperature sensor 106 may generate a signal corresponding to the temperature at or adjacent to the pipe 20. The sensor signal may be communicated to the user device 80 and/or the central monitoring system 82.

As mentioned above, the threshold circuit 60C may have a high-level threshold and a low-level threshold. The sensed pressure above the high-level threshold may indicate a plug or obstruction in the exhaust pipe 20 higher than the exhaust fan. As will be described below, the low level light or segment may indicate a low-pressure fault. A low-pressure fault is indicated when the pressure is below the low threshold. This can happen when the under slab area 16 is frozen or the exhaust pipe 20 is frozen or clogged before the exhaust fan 22. High pressure may be indicated by the segments in the display all being illuminated. The segments may also change color when over a threshold. The activation of the display is controlled by the display circuit 60E.

The comparison circuit 60B may also be used to compare the chemical level sensed by the chemical sensor 70 to a chemical threshold.

A pairing button 88 is used to signal the wireless interface 78 to pair with a local area network 90 with a router 92. The router 92 is coupled to the internet 94, which communicates signals wired or wirelessly to the user device 80 and the central monitoring system 82 or an internet-of-things device. The router 92, the LAN 90 and the Internet 94 represent a network 93. In addition, the network 93 may be a cellular network, optical network, the Ethernet, WiMax, satellite, infrared, radio or combinations thereof. The pairing button 88 may also allow the wireless interface 78 to establish communication directly with a user device 80 through Bluetooth or another short-range wireless communication protocol.

A proximity sensor 96 may be used to wake-up certain circuitry such as the display 74 when movement is detected within a certain range of the monitoring system 30. The proximity sensor 96 is extremely useful to conserve battery when only the battery 72 powers the monitoring system 30. Selecting one of the buttons 86, 88 is an alternative to the proximity sensor. The proximity sensor 96 may be a motion sensor used to detect motion near the monitoring system 30 and communication a motion signal to the controller 60. The proximity sensor 96 generates the motion signal when an object moves within a predetermined distance such as within 3 feet or 6 feet. The monitoring system 30 and the controller 60 may control the backlight 98 the illuminates the manometer 64 from behind. This allows a viewer to view the fluid level in the manometer easily.

A backlight 98 may be disposed of in the housing and may be used to illuminate the manometer 64 from within the housing for easier viewing. Because the manometer 64 and the colored fluid 68 are translucent, light can travel therethrough so that an observer can detect the fluid level within the manometer 64. The backlight 98 may also be activated by the proximity sensor 96. The backlight 98 may be a light emitting diode.

A timer 100 may be included in or outside the controller 60. The timer 100 may be used to time various events such as but not limited to the time since the last reset button was pushed or the time since the low threshold or the high threshold was crossed.

A status indicator 104 such as an LED may be used to provide a status of the system and/or provide feedback relative to the system. The status indicator 104 may flash or remain illuminated or extinguish based on various indications to be communicated.

Referring now to FIG. 3A, the manometer 64 has two legs 310, 312 with a U-shaped portion 314 therebetween. Leg 312, in this example, has the manometer pressure sensor 66 coupled thereto. The manometer pressure sensor 66 may vary in width and sense an electrical characteristic signal corresponding to an electrical characteristic. An electrical characteristic change sensing circuit 316 determines a change in the sensor signal. An electrical signal is communicated to the controller 60 from the electrical characteristic change circuit 316.

The first leg 310 is spaced apart from the second leg 312 with the U-shaped portion 314. A first portion 310A may be generally parallel to the second leg 312. A first curved portion 310B curves the first leg 310 away from the second leg 312. The first curved portion 310 has a double "L" configuration. That is, the first curved portion 310B has two consecutive ninety degree bends that couple to a third portion 310C The third portion 310C is parallel or generally parallel to the first leg 310 and the second leg 312 but spaced further from the second leg 312 than first portion 310A. A second curved portion 310D joins the portion 310C to the curved portion 314 that joins the first leg 310 and the second leg 312 also with a double-L configuration similar to that set forth above but the mirror image thereof. As will be illustrated below, the third portion 310C may be flush with, nearly flush with or partially extending from an opening in a housing of the monitoring system 30 to allow the level of fluid therein may be visually monitored.

Referring now to FIG. 3B, a second example of a manometer 64' is shown. In this example, the leg 310 is the same as described above. The leg 312 has been modified with an upper U-shaped portion 330, a down pipe 332 that extends downward from the upper U-shaped portion 330. The downpipe has a curved portion 334 that forms one of the conduits 36A with an extension that extends from the housing 432.

The second conduit 36B has a second extension 338 that is coupled to at least one curved portion 340 before coupling to the pressure sensor 62.

Figure 3C:
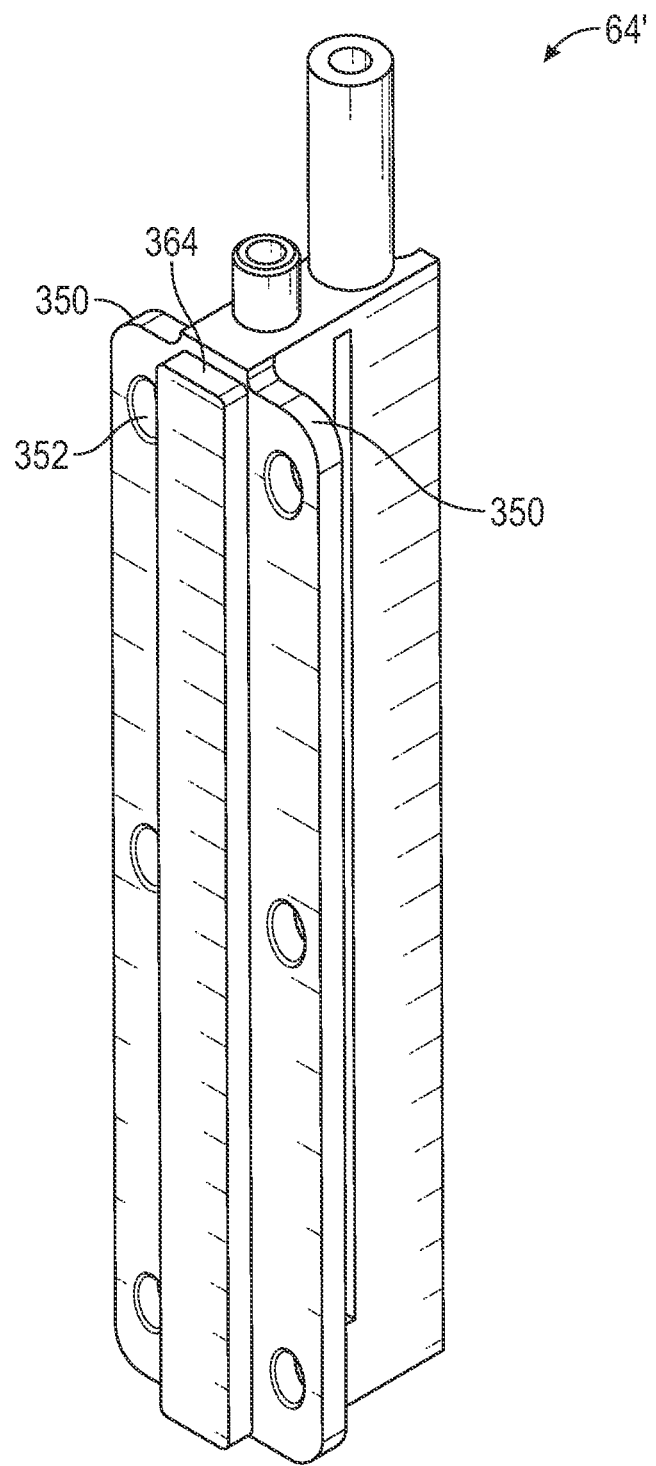
FIG. 3C is a front perspective view of a third example of a manometer.
Figure 3D:
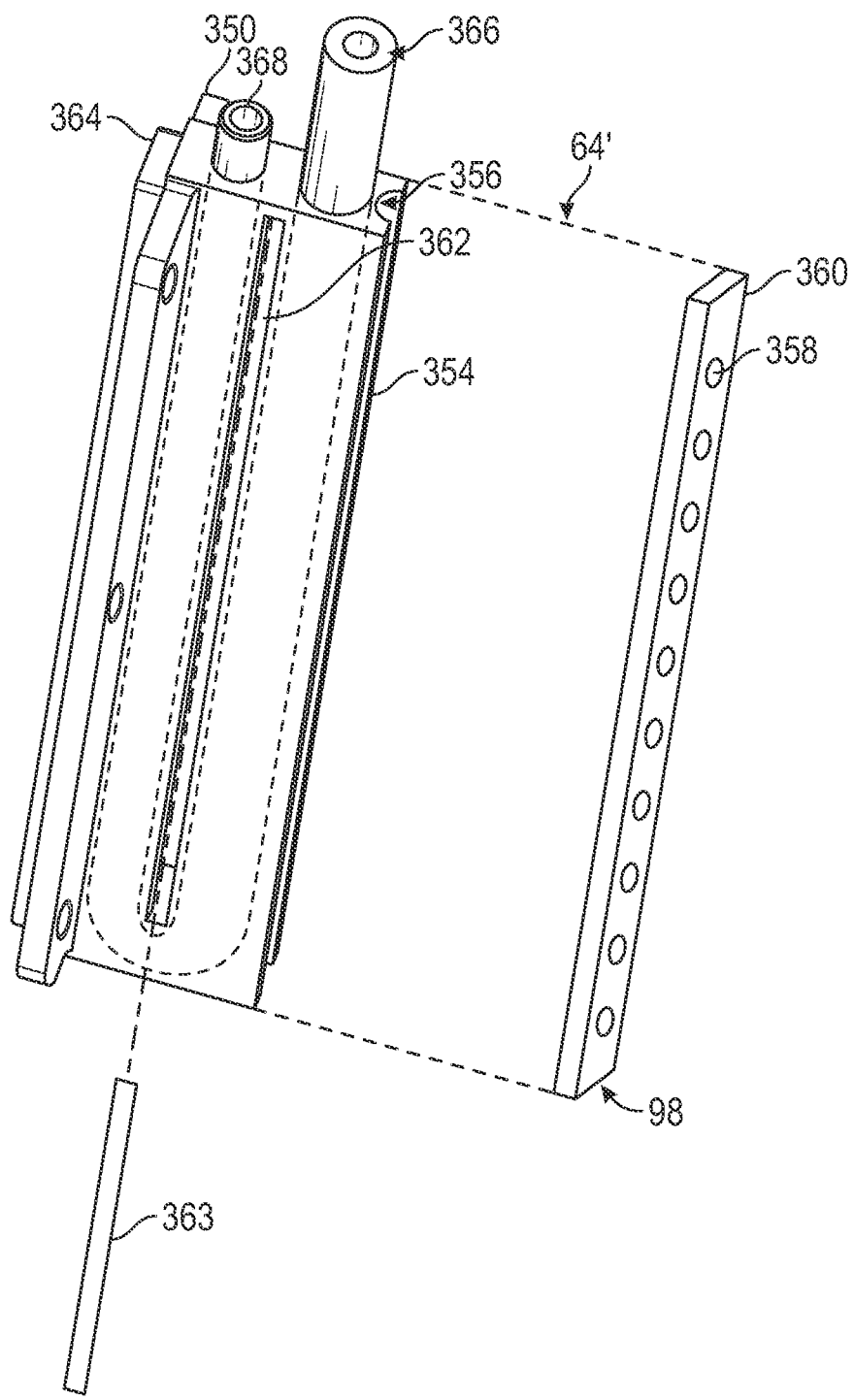
FIG. 3D is a rear-top perspective view of the manometer of FIG. 3C.

Referring now to FIGS. 3C and 3D, an alternate manometer 64' is set forth. In this example, the manometer 64' is integrally molded with a bracket 350 that is disposed on each side of the manometer. The bracket 350 has holes 352 that are used for receiving a fastener therethrough. The fasteners (not shown) couple the bracket 350 and thus the manometer 64' within the housing as is based illustrated in FIG. 4A as shown below. The manometer 64' has a U-shaped channel 354 that is outlined in dashed lines. The channel 354 is integrally molded with the rest of the manometer 64'. A light channel 356 is used for receiving a strip of LEDs 358. The LEDs 358 may be disposed on a circuit board 360.

Between the two arms of the channel 354, an opening 362 is disposed therethrough. The opening 362 allows a reduced amount of plastic material to be used during the manufacturing. However, the opening 362 also allows a color film or paper 363 to be placed therebetween so that when the LEDs of the backlight 98 shine through the molded manometer 64', a different color appears to the user through a display window 364.

The display window 364 is integrally formed on the manometer 64 adjacent to one of the arms thereof. In this example the display window fits within a rectangular slot in the housing as shown below The channel 354 has a first extension 366 that extends from the housing as will be illustrated below. The second extension 368 remains within the housing and is coupled to the volume to be measured such as the pipe.

The entire manometer 64' is formed from clear plastic so that light from the backlight 98 is transmitted therethrough.

Figure 4A:
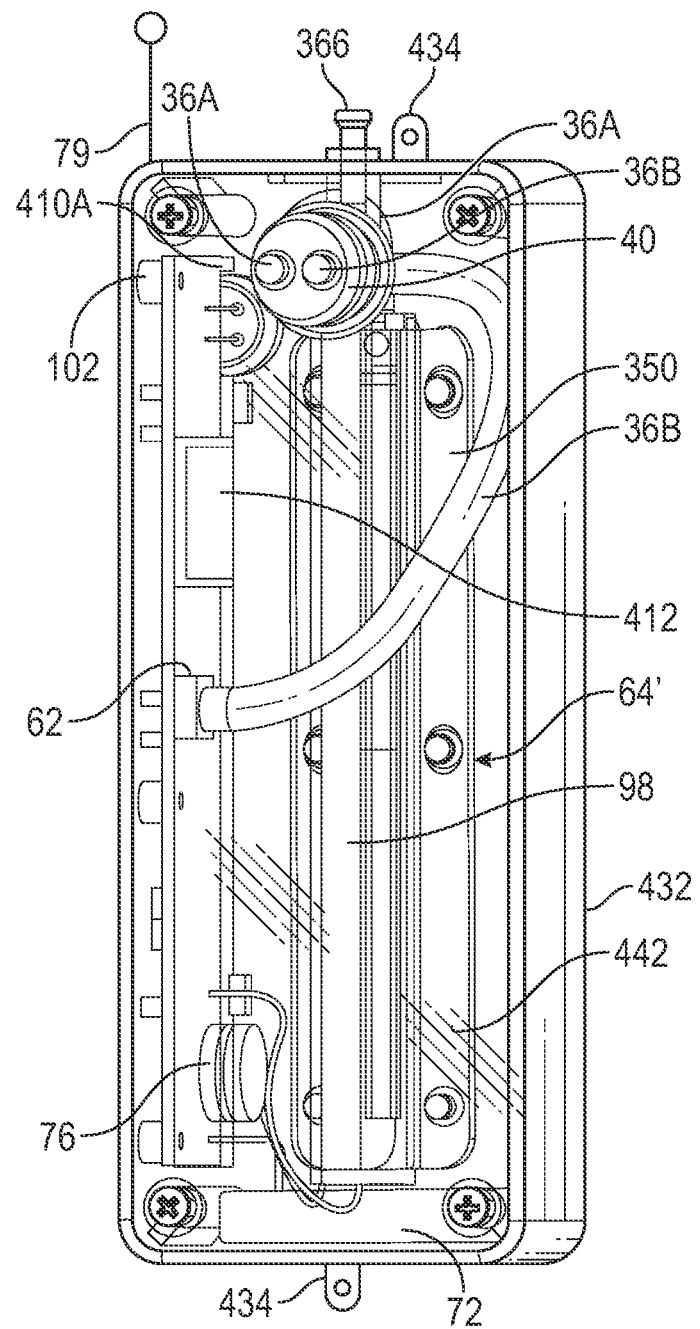
FIG. 4A is a perspective rear view of the monitoring system.
Figure 4B:
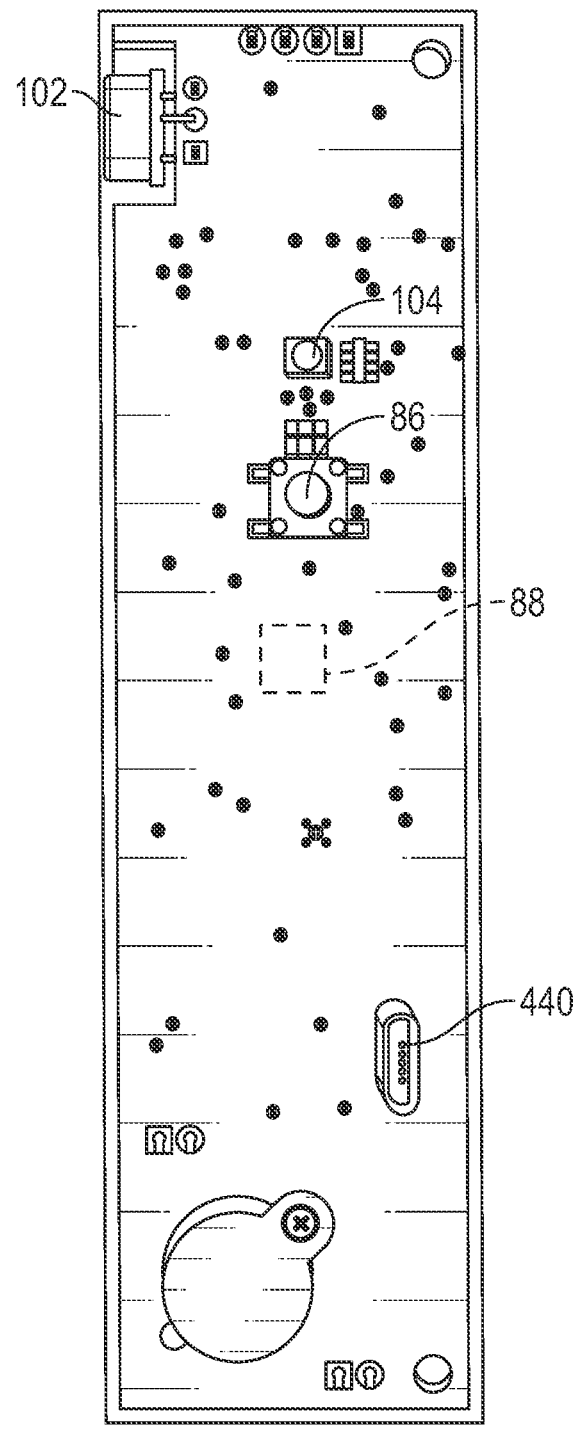
FIG. 4B is the front view of one of the circuit boards of the monitoring system.
Figure 4C:
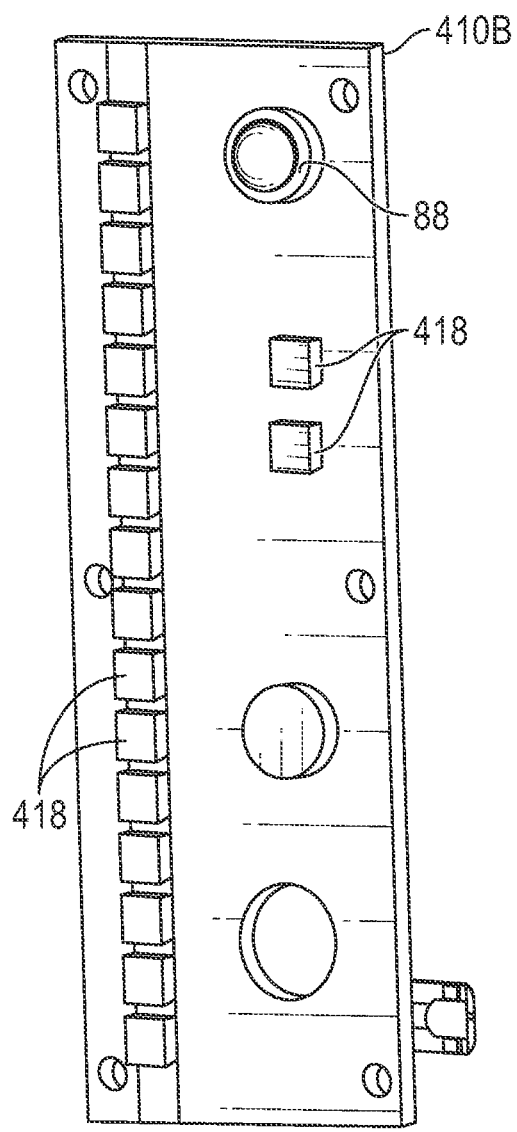
FIG. 4C is the front view of an LED circuit board of the monitoring system.

Referring now to FIGS. 4A-4C, the controller 60 may consist of a plurality of circuits disposed on one or more circuit boards 410A, 410B. A microprocessor 412 is disposed of on the circuit board 410A. FIG. 4B is the front side of the circuit board 410A and includes the reset button 86, pairing button 88 (if so equipped), and LEDs 414 that illuminate the colored segments of the display 74, to display the indication of pressure in the programmed manner as is best illustrated in FIG. 4C. In FIG. 4A the backlight 98 is illustrated for illuminating the manometer 64. The backlight 98 may take the form of a strip of LEDs 358 as illustrated in FIG. 3D. A backside of the housing 432 is illustrated in FIG. 4A which includes the grommet 40 with conduits 36A and 36B disposed therein. The conduits 36A and 36B are coupled to the manometer 64 and the pressure sensor 62, respectively. LEDs 414 may be used to indicate a high chemical concentration or a normal chemical concentration. Colored covers 418 over the LEDs 414, 416 may be used to protect and or form the desired color. Of course, the colored segments 418 may be clear and used to protect the underlying LEDs, which may be colored. The backside 436 of the housing 432 encloses the circuit boards 410A, 410B and circuitry within the housing 432.

The antenna 79 is illustrated extending from the housing 432 which houses the manometer 64 and the circuit boards 410A, 410B. However, the antenna 79 may be fully disposed within the housing 432. Optional mounting tabs 434 may extend from the top and bottom of the housing 432 to provide a place for mounting.

A USB power port for providing DC voltage to the circuitry within the housing 432 is mounted, in this example, to the circuit board 410A.

A bracket 442 is used for securing the manometer 64 to the housing 432.

Figure 5A:
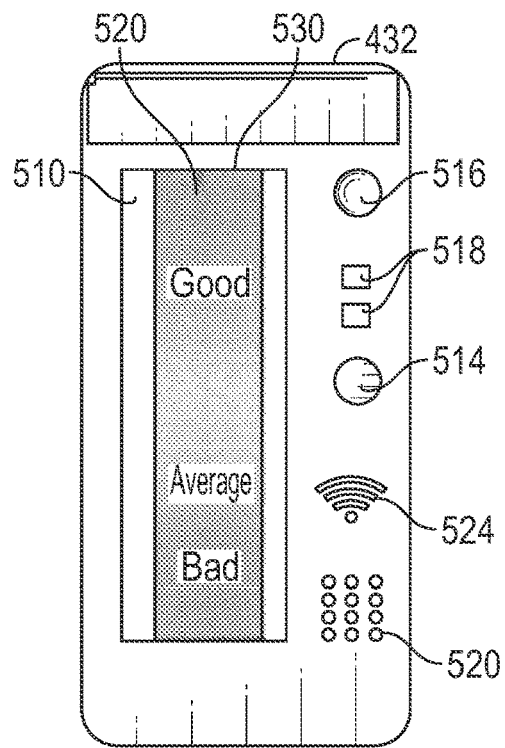
FIGS. 5A and 5B are views of the front of one example of the monitoring system.
Figure 5B:
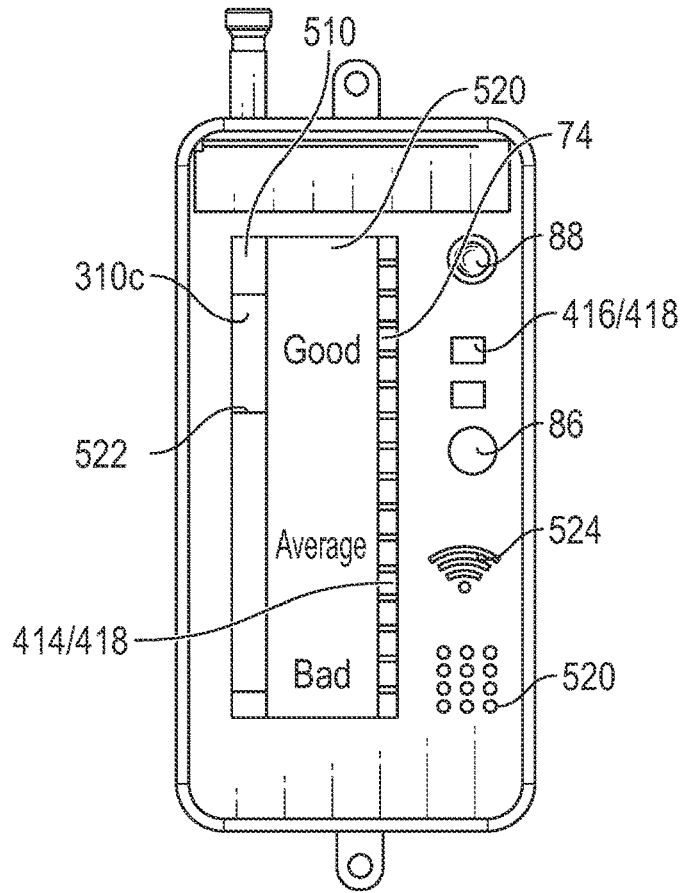

Various views of the housing 432 in various states of assembly are illustrated in FIGS. 5A-5F. In FIG. 5A, the manometer is removed. In FIG. 5B, the manometer 64 is disposed of in an elongated opening 510. Corresponding openings 512 in the housing 432 allow the speakers to be accessible. Openings 514 and 516 allow the respective reset button 86 and pairing button 88 to be accessible. Openings 518 allow the chemical concentration indicators to be viewed. Openings 520 allow sound to pass through the housing from the speaker 76. The liquid level 522 of the manometer 64 may be visually inspected through the opening 510. An indicator 524 may be used to communicate the status of the operation of the wireless interface 78.

The visual display 74 may indicate a good range in green, an average range in orange, and a low range in red. The display 74 may be triggered by the motion sensor 102. The normal operating range, as mentioned above, is defined between the thresholds. When the sensed pressure is below the low threshold, the portion of the display corresponding to the bottom light emitting diode is illuminated. All the light emitting diodes may be illuminated when the sensed pressure is above the upper pressure threshold. A color change and or flashing LEDs may also be used to indicate the condition. The levels or number of segments illuminated correspond proportionally to the pressure sensed by the pressure sensor(s), in this example. A decal or indicia 528 may be applied to the face of the housing 432 to indicate the levels (good, average, low in this example). Should an LCD display be used the indicia 528 may be incorporated on the display 74. The liquid level in the manometer may also correspond to the level of segments illuminated. That is, as the manometer level changes, the level of the segments changes. The volume, length and the diameter of the manometer 64 as well as the density of the fluid therein is accounted for in synchronizing the movement of the fluid level of the manometer to the LED illumination level of the segments.

Figure 5C:
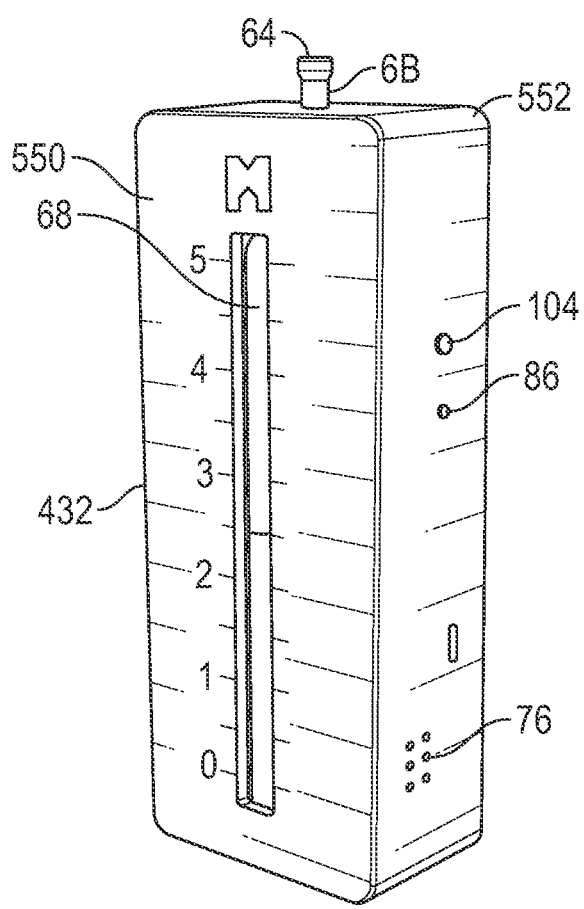
FIGS. 5C and 5D are perspective views of the front and rear of a second example of the monitoring system.
Figure 5D:
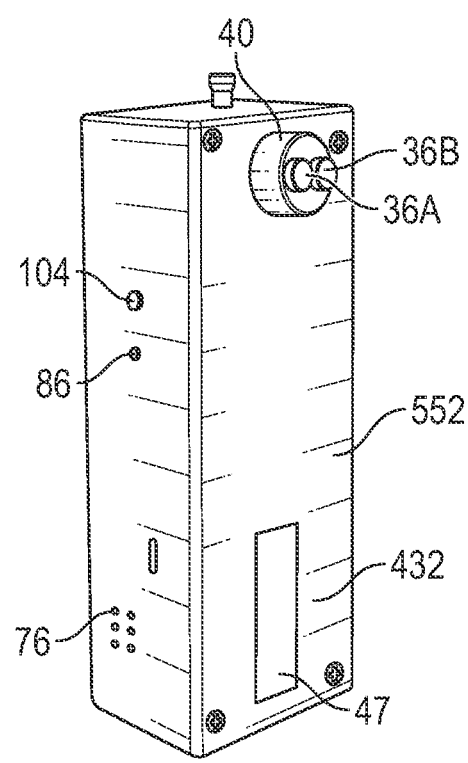

In FIGS. 5C and 5D alternate perspectives of the monitoring system 30 are illustrated with the various components such as the manometer 64 on a front panel 550 of the housing 432. The status indicator 104, the reset button 86 and the USB power port 444 are illustrated on the side panel 552 of the housing 432.

Figure 6A:
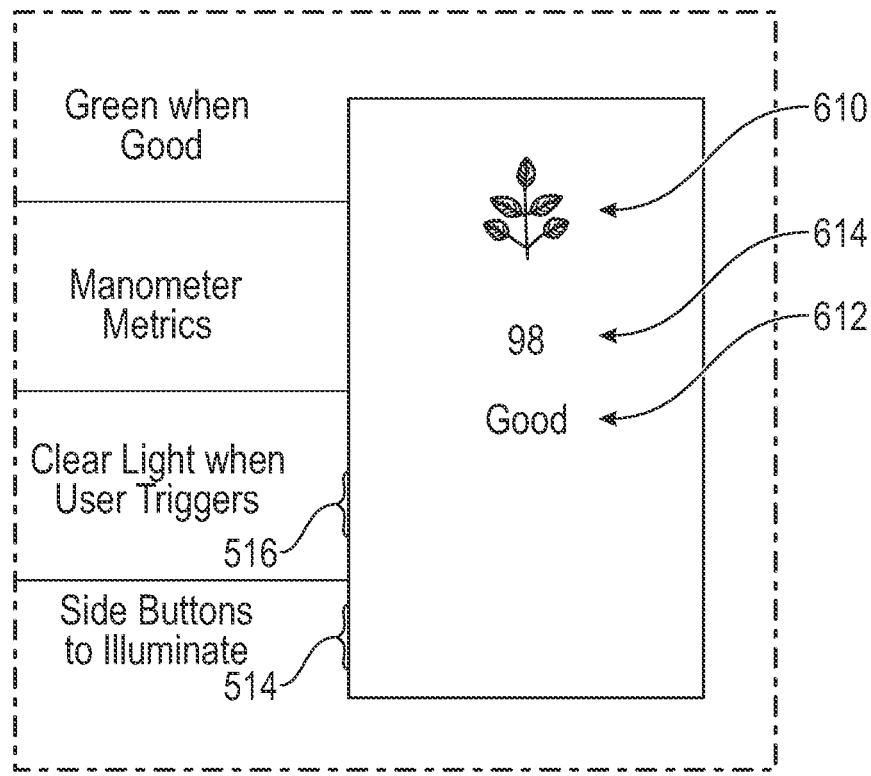
FIG. 6A is an alternate view of a display for the monitoring system.

Referring now to FIG. 6A, other types of visual indicators may be provided including illuminating the visual display only when triggered by the user through touching a button such as a reset button or when moving near the device and the proximity sensor detects nearby movement. A front panel 610 displays the range or level of pressure numerically or with a level indicator 612 such as good, average or very low together with a numeric value. Color may also be used to provide an indicator. Green color indicates good and red color may indicate a low range such as that illustrated in FIG. 6B. The front panel 610 may be flexible to allow the switches behind to be closed or activated. In addition, areas of the panel 610 may be translucent or opaque to allow indicators to be illuminated. Pairing button 88, reset button 86, the pairing button opening 516 or reset button opening 514 may be moved to a side panel. When a fault is to be indicated, a glow from an internal LED may be cast on a wall.

Figure 6B:
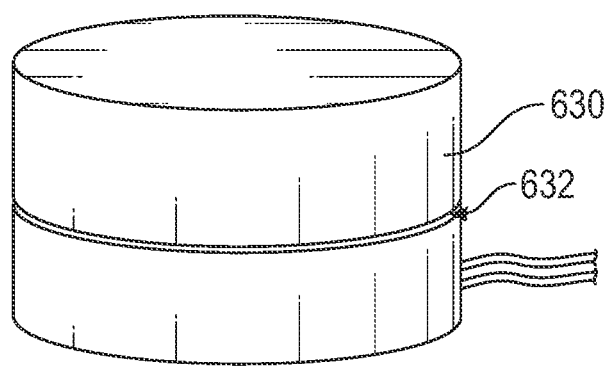
FIG. 6B is an example of a smart home device for altering users.

Referring now to FIG. 6B, the user device described above may also be a stand-alone device or incorporated into a smart home device 630 such as Google Home® or Amazon Alexa®. Additionally, the warnings may be incorporated into a smart thermostat. A wireless warning signal is received at the smart home device 630. The monitoring system 30 through the local area network 90 communicates the warning signal. In FIG. 6B the status light 632 may change color to indicate the system is operating normally or to indicate pressure or chemical concentration is out of range. The status light 632 may also be used to indicate the battery needs to be changed or there has been an interruption in the voltage to the monitoring system.

Figure 7:
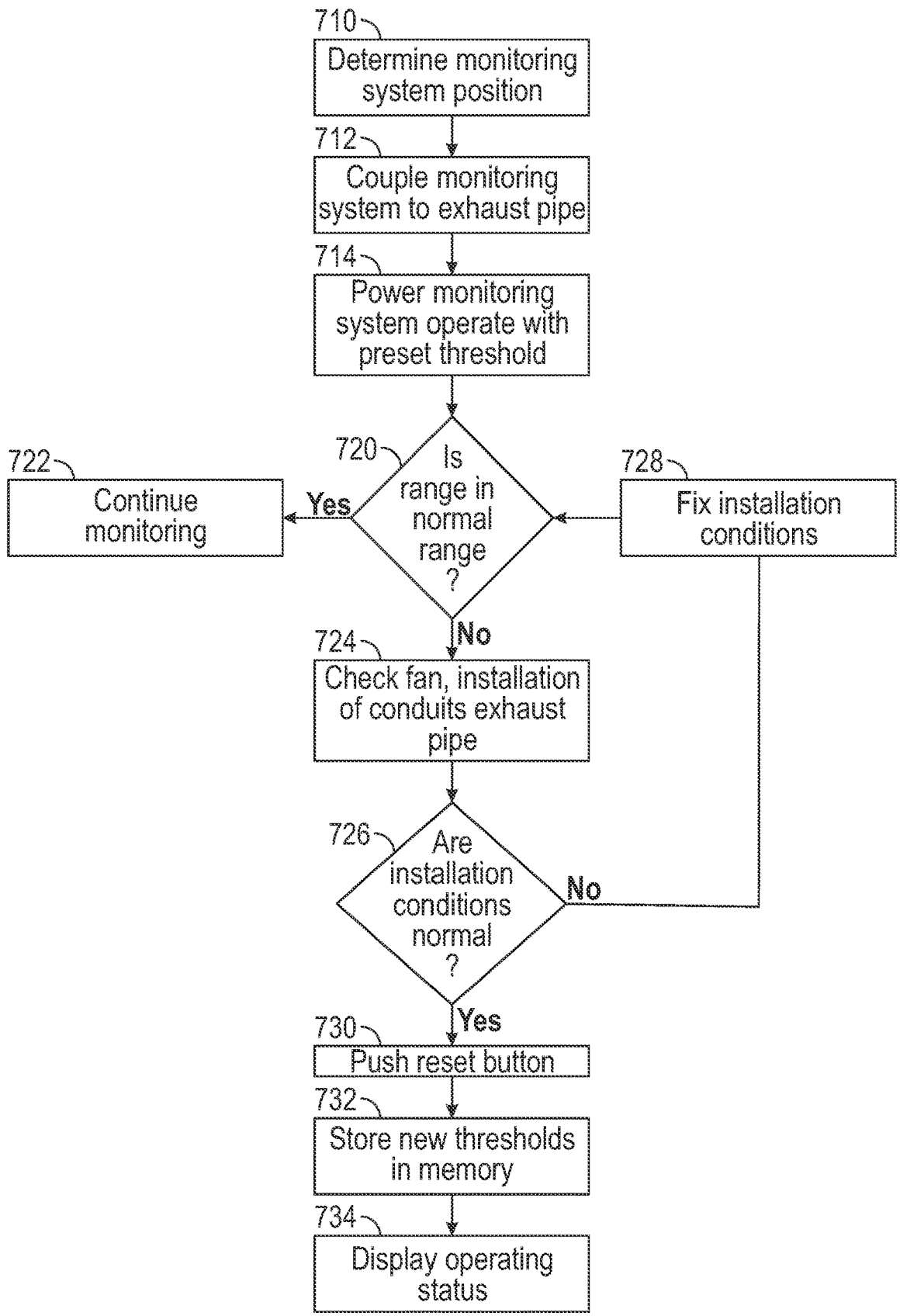
FIG. 7 is a flowchart of a method for installing the monitoring system.

Referring now to FIG. 7, a method of installing the monitoring system is set forth. In step 710, the position of the monitoring system 30 is determined by the installer. The monitoring system 30 may be mounted directly on the exhaust pipe 20 as illustrated in FIG. 1A. However, a more remote location near the exhaust pipe 20, such as within the building, may also be used as illustrated in FIG. 1B. The monitoring system 30 is coupled to the exhaust pipe in step 712. As mentioned above, the exhaust pipe 20 may have an opening 38 therethrough and one or more conduits leading from the interior of the exhaust pipe 20 to the monitoring system 30 may provide fluid communication therebetween. That is, the pressure of the exhaust pipe may be monitored by the monitoring system. In the example set forth above, two conduits were used so that a manometer and an electrical sensor are used to monitor the pressure in the exhaust pipe. As mentioned above, the chemical sensing conduit may be a separate conduit as well. In step 714, the monitoring system is operated with a preset threshold after installation. That is, the unit may come with an upper pressure threshold and a lower pressure threshold stored in the memory. In step 720, if the range is within a normal range after installation, monitoring continues in step 722. When the range is not in the normal range, step 724 is performed in which the installer checks the fan, the installation of the conduits and then exhaust pipe 20 for abnormalities.

In step 726, if the installation conditions are not normal, the installation conduits are remedied in step 728. In step 726, if the installation conditions are normal, the reset button is pushed once or twice depending upon the configuration. By pushing the reset button in step 730, at least one of the thresholds such as the high threshold is adjusted so that the current operating pressure is within the thresholds. In step 732, the new threshold or thresholds are stored within the memory of the system. In step 734, the operating status of the system is provided on the display.

Figure 8:
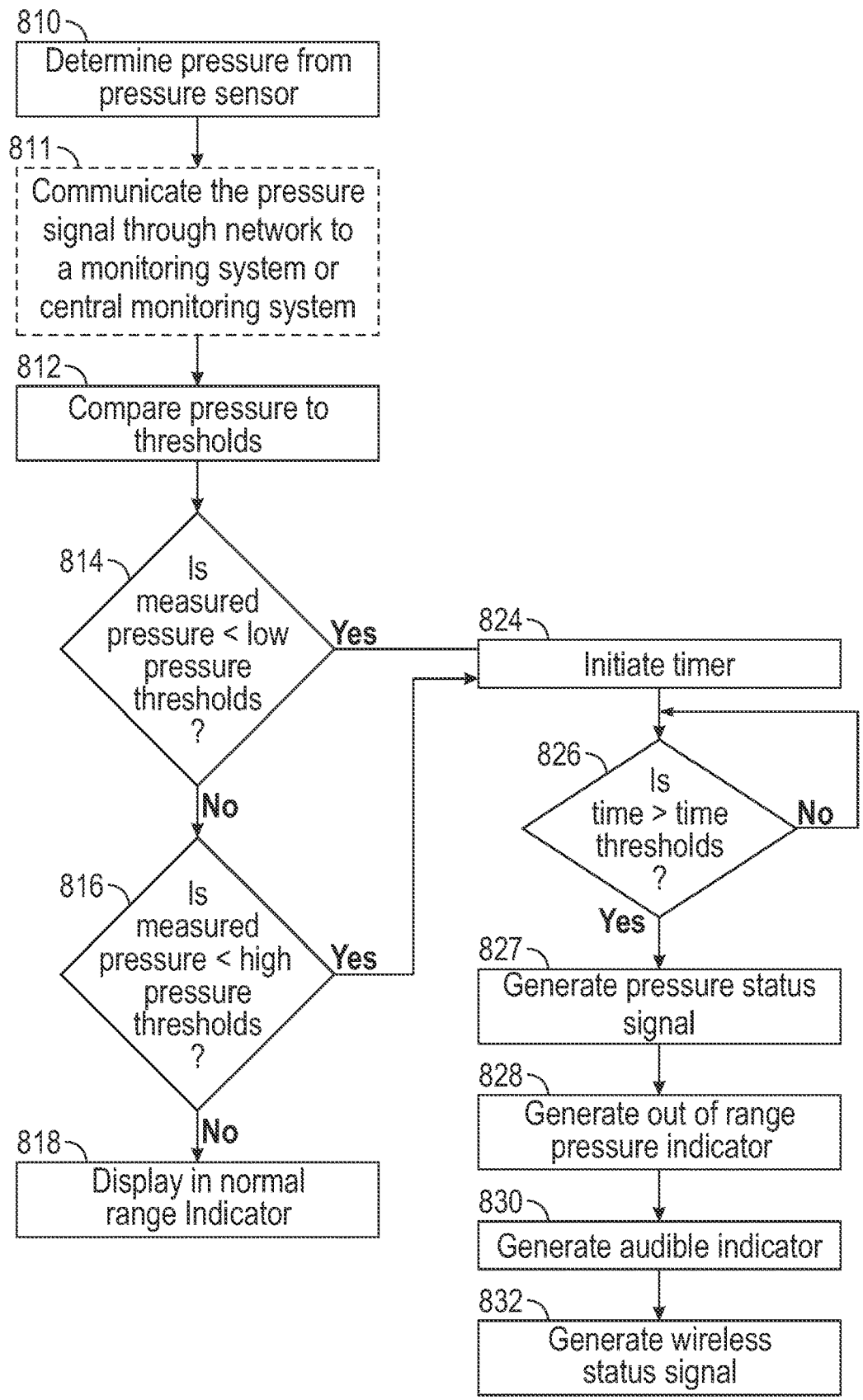
FIG. 8 is a flowchart of a method for performing the monitoring.

Referring now to FIG. 8, a method of operating the monitoring system is set forth. The method is suitable for being performed at an under slab or under floor sensor or a sensor associated with the monitoring system in the pipe. The monitoring system 30 is in the same building as the sensor(s). The central monitoring system 82 is remote from the pressure sensor. A user device 80 and an application therein, and combinations of the above. In step 810, the pressure is determined from the pressure sensor. That is, an electrical signal is generated from the pressure sensor or sensors indicative of the pressure in the exhaust pipe 20 or under the slab as described below relative to an under slab sensor. The electrical signals may be locally processed at a controller associated with the monitoring system 30 or at the under slab sensing system described below where the sensors are located. However, the raw sensor signals may be communicated to the app of a user device or a central monitoring system where they are compared to thresholds and out of range indicators are generated. In step 812, the measured pressure signals are compared to the pressure thresholds in step 812. In step 814, when the measured pressure is not less than the pressure threshold, step 816 compares the measured pressure to a high pressure threshold. When the measured pressure is not greater than the high pressure threshold, a display is generated in step 818 that indicates the range is within a normal range. As mentioned above, many types of displays may be generated. Numerical, segmented or other types of displays may indicate out of range in various ways. Green, for example, may be used to illuminate the segmented display LEDs or a faceplate to indicate the status is within the normal range. The segmented display may illuminate a number of segments that are proportional to the measured pressure.

Referring back to step 814, when the measured pressure is less than a low-pressure threshold, or in step 816, when the measured pressure is greater than high pressure threshold an out of range signal may be generated, step 824 optionally initiates a timer. In step 826, when the time period of the timer is greater than the time threshold, step 828 is performed. When the time period is not greater than the threshold, step 826 is repeated. The duration of the time period prevents the monitoring system from reporting extraneous or very short duration of pressure out of range conditions. The delayed reporting may allow the system to self-correct (changed weather conditions). Because chemical build-up within a building happens gradually, the time period may be many minutes, hours or days. As mentioned above, the timing step is optional.

In step 827, a pressure status signal of the pressure being out of range signal may be generated. The status signal may be used to generate indicators as a wireless status signal.

In step 828, an out-of-range pressure indicator is provided on a display. As mentioned above, the out-of-range pressure indicator may indicate a low number of segments, and may be a color such as red in an actual device. For example, on the display, the bottom light emitting diode on the circuit board may be illuminated. In the present example, both a high-pressure range and a lower pressure range, both above and below their respective thresholds, generate a red indicator to warn the system user of the out-of-range condition. High pressure may illuminate all the segments in the segmented display. The upper segments may be green until the high-pressure threshold is crossed for a time, and then changed to red with or without flashing.

In step 830, an audible indicator may also be provided instead of or in addition to the visual indicator. The audible indicator may also be provided in a similar manner to that of the visual indicator by waiting a predetermined time beyond the time threshold.

In step 832, a wireless pressure status signal may be also communicated to the central monitoring system or a user device through Wi-Fi, Bluetooth, a cellular phone system or the like. The status signal may be a warning signal that has an indication of pressure in the exhaust pipe or under the slab. The central monitoring system may notify a dispatch or technician to fix the conditions at the monitoring system in response to the backup battery.

Figure 9:
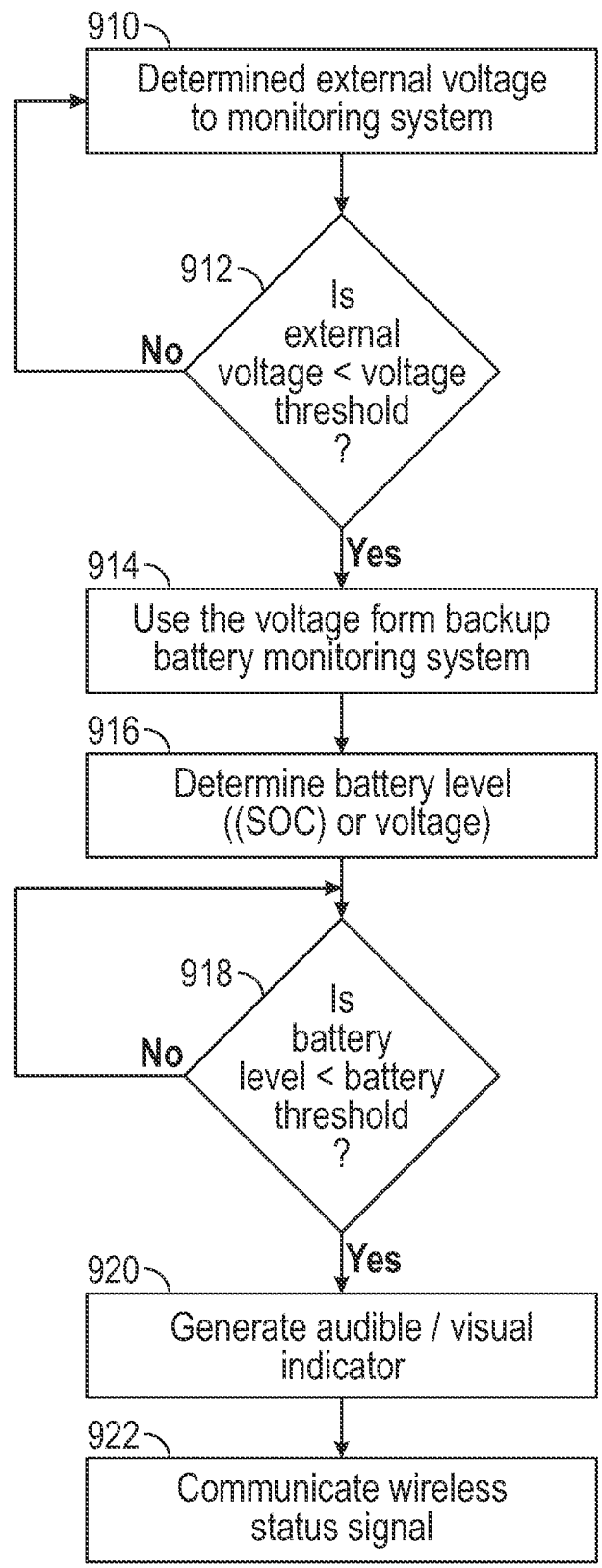
FIG. 9 is a flowchart of a method for monitoring battery voltage.

Referring now to FIG. 9, the external voltage to the monitoring system may be determined in step 910. At this time, the battery for backup may be charging. When the external voltage is not less than the voltage threshold, step 910 is repeated. In step 912, when the external voltage is less than the voltage threshold, step 914 uses the battery as a primary voltage source. Of course, the changeover to battery may be seamlessly implemented in circuitry so that when the external voltage drops, the battery is used. In step 916, the battery level such as voltage or state of charge is determined. In step 918, it is determined whether battery level is less than a battery threshold. If the battery level is not greater than the battery threshold, step 918 is repeated. In step 918, when the battery level is less than the battery threshold, the audible and visual indicators are generated in step 920. Audible and visual indicators are described above. In step 922, a wireless status signal for the voltage may be communicated wirelessly through Bluetooth or Wi-Fi to a user device or a central monitoring system. The central monitoring system may dispatch a technician to determine the issue after a time. Also, the service technician may be deployed when the battery has reached the end of its useful life.

Figure 10:
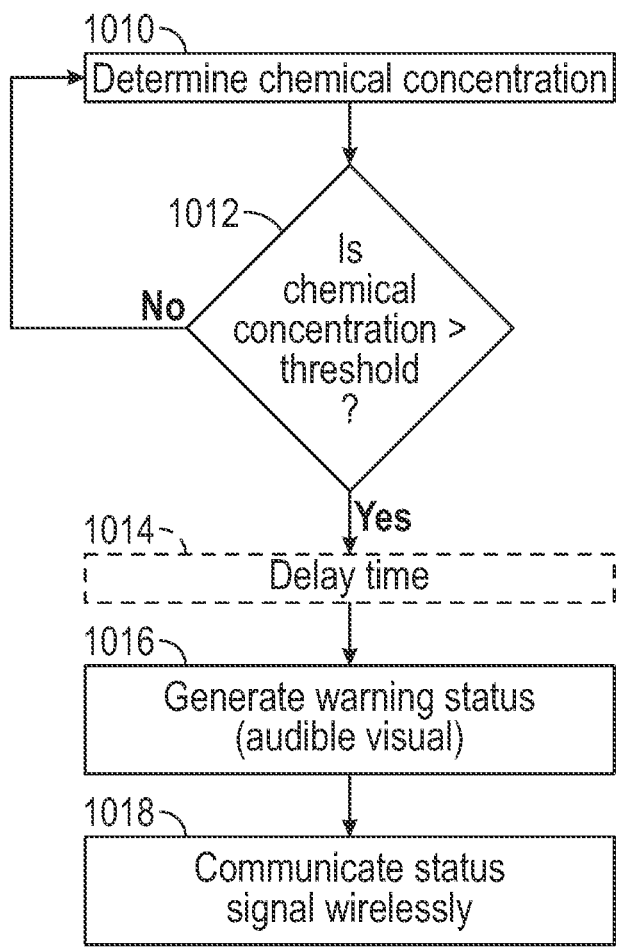
FIG. 10 is a flowchart of a method for displaying chemical concentration.

Referring now to FIG. 10, the monitoring system 30 may include a chemical concentration sensor 70 that is used to monitor the chemical concentration of the airflow within the exhaust pipe 20. The air quality sensor set forth below is also a chemical concentration sensor and acts in the same way. However, multiple chemical concentration sensors may be provided in one air quality sensor. Each chemical may be compared as set forth in FIG. 10. In step 1010, the chemical concentration from the chemical concentration sensor 70 is determined. The chemical concentration 70 corresponds to the amount of the chemical of interest within the exhaust pipe 20 or under the slab at the sensor position. In step 1012, the chemical concentration of step 1010 is compared to a concentration threshold. When the chemical concentration is not above the concentration threshold, step 1010 is again performed. In step 1012 when the chemical concentration is above the chemical concentration threshold, a delay time at step 1014 may perform in a similar manner to steps 824 and 826. The delay time may be a predetermined amount of time before step 1016 is performed. In step 1016, a warning status may be generated. The warning status may be an audible warning such as through the speaker or a visual warning such as through the LEDs 416. In step 1018, the status signal may also be communicated wirelessly to a central monitoring system or to the application of the mobile or user device 80.

Figure 11:
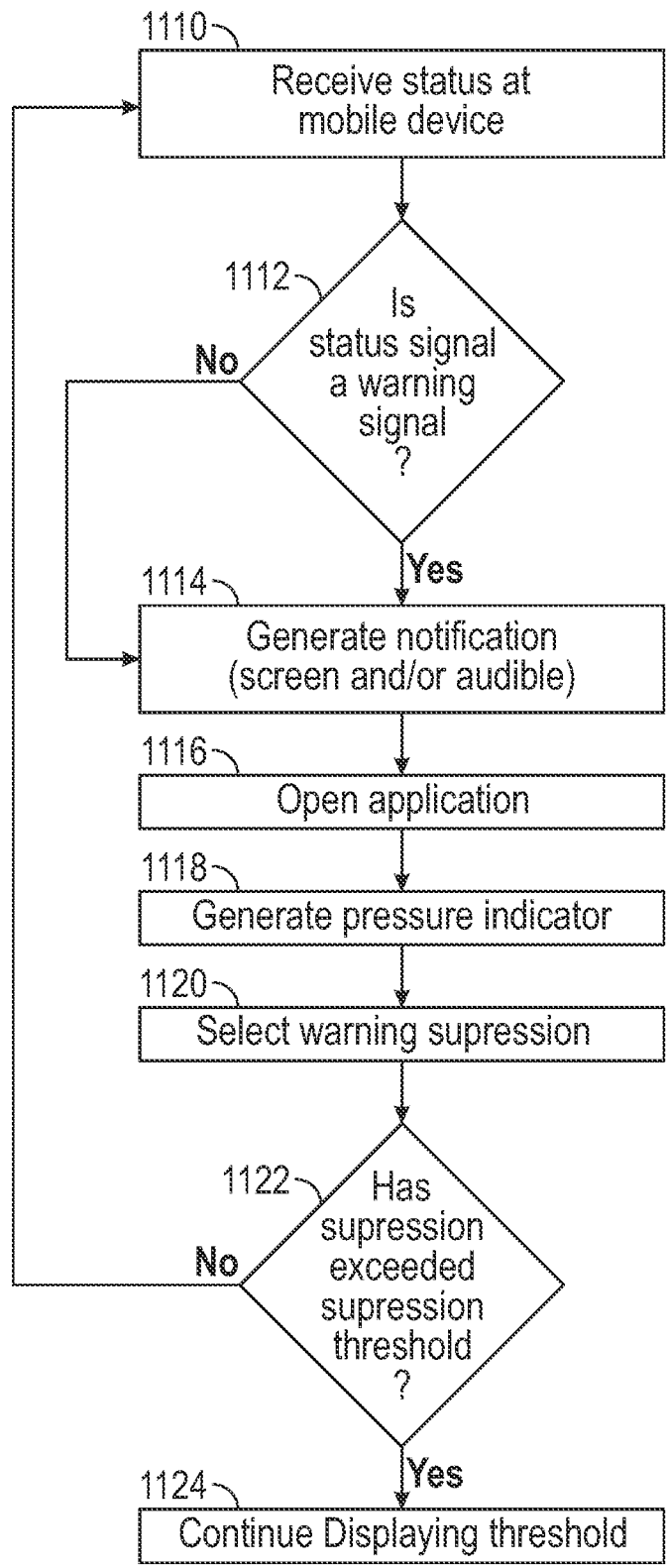
FIG. 11 is a flowchart of a method for operating an application on a user device.

Referring now to FIG. 11, the operation of the mobile device is illustrated in further detail. In step 1110, the status signal is received at the mobile device. In step 1112, the determination of whether the status signal is a warning signal is performed. A non-warning may be generated when the system provides data corresponding to the pressure level or concentration level without crossing one of the thresholds. The non-warning signal may be from a request through the application of performance on a regular basis per setting in the application. When the status signal is a warning signal step 1114 generates a notification at the mobile device. The notification may be a screen and/or audible signal to warn the user that some type of status is outside of the limit. In this example, the pressure or the chemical concentration, or both may be outside of the thresholds. After step 1112 indicates that the status is not a warning signal or after step 1114, the application may be opened on the display of the mobile device. In step 1118, a pressure indicator may be provided in a manometer graphical user interface type display. A chemical concentration indicator may also be provided. The application may be used for monitoring and two-way communication with the monitoring system 30. It is helpful for warnings to be generated but, in some situations, the user may desire to know the current status. In step 1120, a warning suppression selection may be performed. By selecting a warning suppression, the warning signal may be snoozed or muted for a predetermined amount of time. However, the system may be set to allow only a certain time for muting or hushing. That is, each mute/hush selection may last a predetermined amount of time. The time may be predetermined or user selectable. In step 1122, it is determined whether the suppression has exceeded a maximum suppression time threshold. When the suppression has not exceeded a time threshold, step 1110 is again performed. In step 1122, when the suppression has exceeded the time threshold, step 1124 continues to display or provide the warning.

Figure 12A:
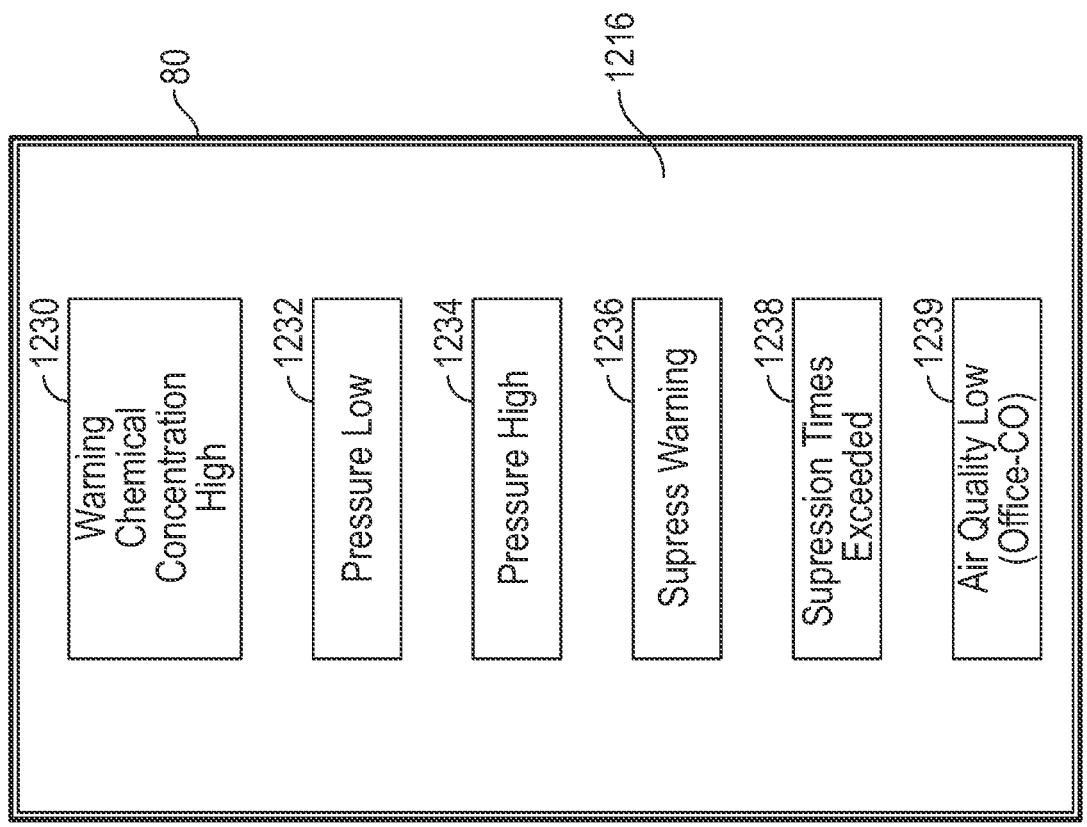
FIG. 12A is a screen display of an application on a user device showing a virtual manometer.

Referring now to FIG. 12A, the mobile device or user device 80 is illustrated. In this example, a simulated manometer display 1210 is set forth. Manometer display 1210 has a pressure level 1212 indicated thereon. In this example, a low-pressure condition in the red area is indicated. An audible display may also be provided by the user device 80 through a speaker 1218.

The user device 80 may include a user interface 1214. The user interface 1214 may include touchscreen buttons displayed on the screen display 1216 of the user device 80. The user interface 1240 may also include buttons disposed on the side of the user device 80. By activating the user interface 1214, various functions can be changed, or data may be communicated back to the monitoring system 30.

Figure 12B:
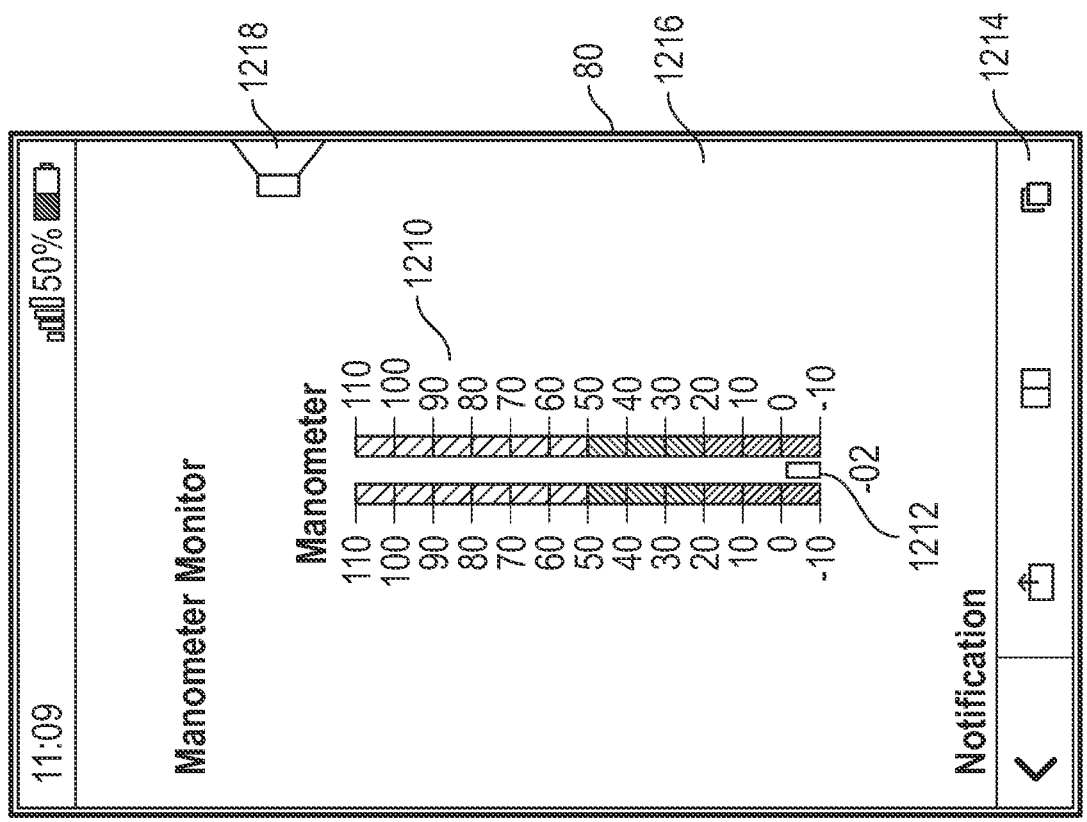
FIG. 12B is a screen display of a screen display having selection and warnings for coupling to the manometer.

Referring now to FIG. 12B, the user device, and in particular the screen display 1216 illustrates a plurality of warnings or selections that may be generated. One or more may be generated at a time. A high concentration chemical warning is provided in indicator box 1230. A low-pressure indicator is indicated in box 1232. A high-pressure warning is indicated in box 1234. When the warnings are to be suppressed, a suppression warning box 1236 is displayed. The suppression warning box 1236, when selected, may allow the user device to request suppression of warnings both at the user device and at the monitoring system 30. The suppression warning box 1236 may initiate a communication to the monitoring system to suppress an audible and or visual warning display thereon. As mentioned above, the suppression warning 1236 may be performed for a predetermined amount of time. The system may also allow a user selectable amount of time such as 12 hours, one day or several days or hours.

The indicator box 1238 corresponds to a warning for the amount of suppression time being exceeded. Should the user select suppression for more than a predetermined amount of time, the suppression request may be denied so that the issue at the monitoring system may be remedied. Failure to remedy the problem within a predetermined amount of time may increase the health risk to the occupants of the building.

An air quality indicator 1239 may also be displayed if air quality sensors are deployed in the building. If more than one air quality sensor is employed, the location of the low quality air may also be indicated. The location in the present example is the "office." The air quality can be for levels of the various chemicals and compounds described above. The air quality indicator may indicate the chemical making the low air quality, which in this example is carbon monoxide.

FIG. 12C is a screen display for an application for logging in with a user device that has an application therein. The screen display has a login button 1242 for logging into the system. Logging into the system may take place after authentication by directly contacting a website or other server. This may be performed using the sign up link 1244.

Referring now to FIG. 12D, operating condition indicators 1246 may be generated. The system indicates that the system is online at a particular address. That is, an address indicator is generated on the screen display 1248. Other indicia of various conditions are set forth such as normal operating conditions, whether freezing temperatures are present, whether there is low pressure (low-pressure indicator), whether there is high-pressure (high pressure indicator) or whether the system is in an installation mode. A system performance selector 1250 may be used for displaying the system performance. A higher maintenance link 1252 may allow the application to request maintenance.

Referring now to FIG. 12E, another screen display 1256 is set forth. In this screen display, the operating status indicators 1258 indicate whether operations were restored, freezing temperatures are encountered, whether previous operations have been restored and the like. The operations restored indicator may indicate a previous date if operations were restored subsequently. A high pressure status indicator or low pressure status indicator may also be generated as part of the data. When the pressure is below the first threshold, a low pressure indicator may be generated. When the pressure within the pipe is above a high pressure threshold, a high pressure indicator may be generated.

Referring now to FIG. 12F, a screen display 1260 is generated that shows a chart 1262 corresponding to a week's worth of sampling of pressure data. A graph of past pressure signals and the latest pressure signal is illustrated.

Figure 12H:
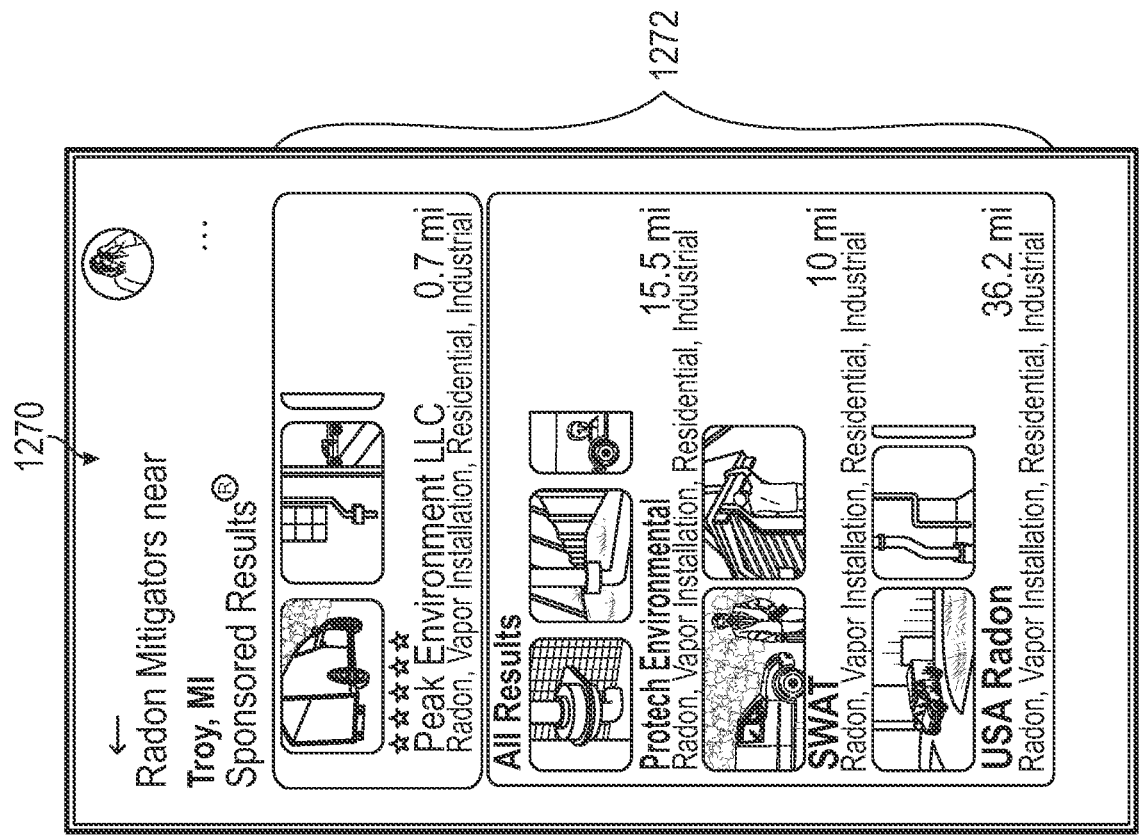
FIG. 12H is a screen display of mitigators displayed in the application of the system.
Figure 12G:
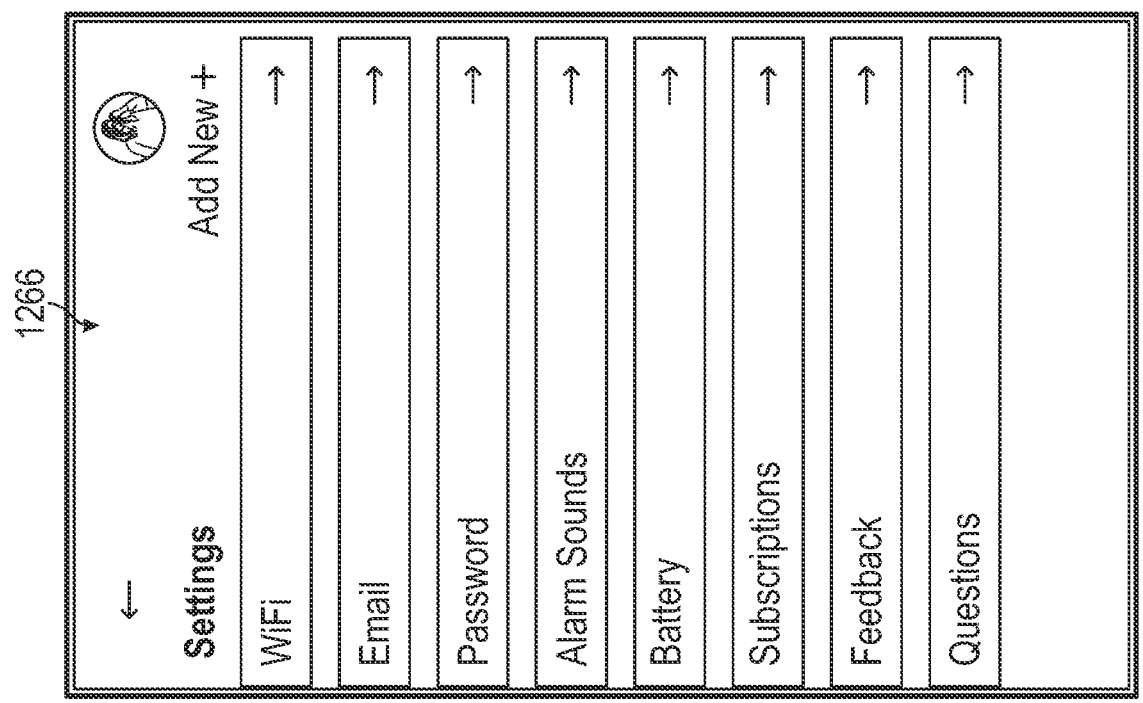
FIG. 12G is a screen display of setting links for the application of the system.

Referring now to FIG. 12G, a screen display 1266 provides links within the application for setting various types of settings for the application to communicate. For example, a Wi-Fi setting, an email setting, a password setting, an alarm sound setting, a battery setting, a subscription setting, feedback setting, or questions may all be provided to the application for establishing various types of communication and enabling communication.

Referring now to FIG. 12H, a screen display for requesting maintenance is provided. The screen display 1270 may display various maintenance provider data 1272 thereon. The maintenance data 1272 may allow one or more service providers to be chosen for remedying a problem with the monitoring system.

Figure 13:
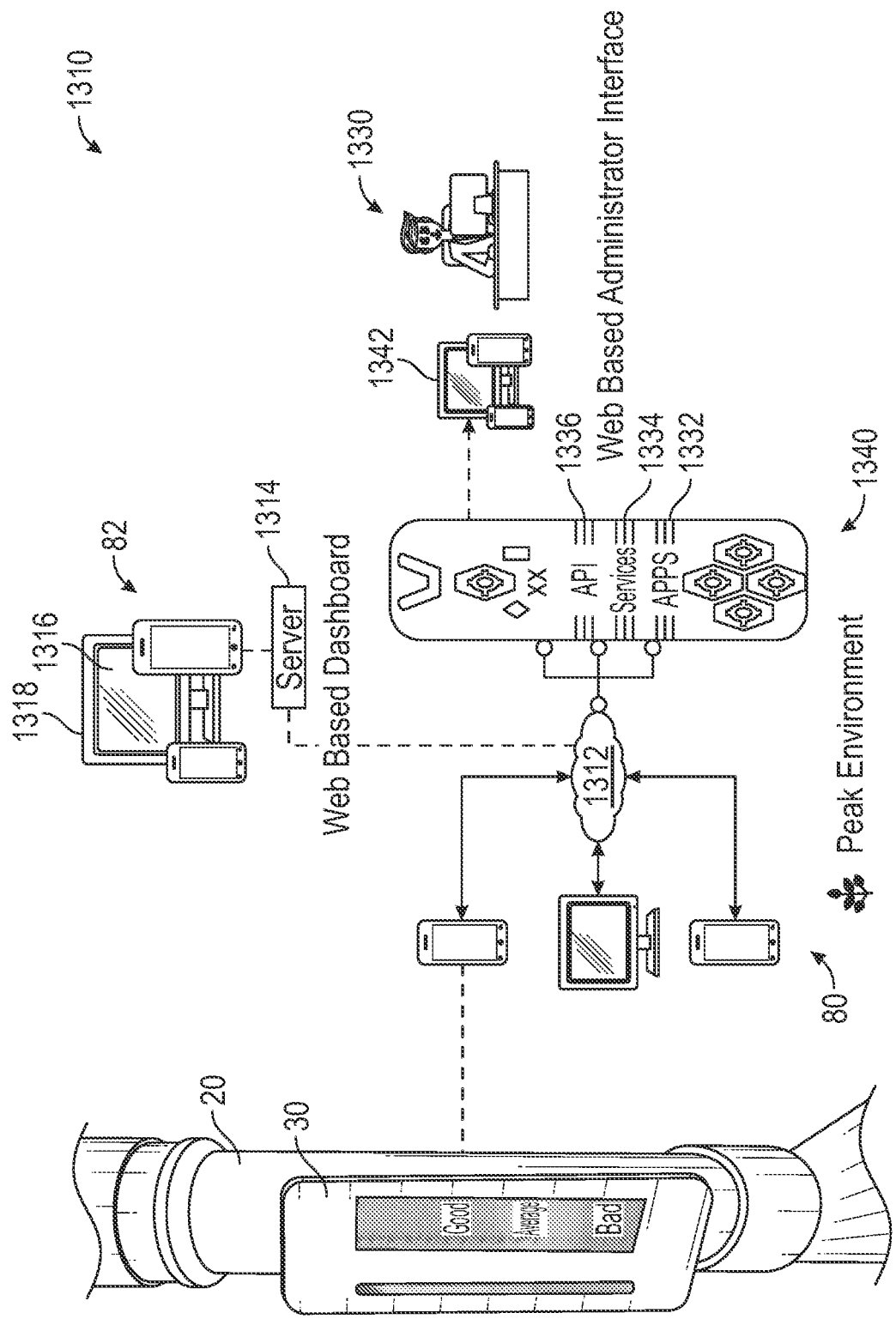
FIG. 13 is a high-level block diagrammatic view of a system for monitoring.

Referring now to FIG. 13, a block diagrammatic view of a monitoring and control system 1310 is set forth. In this example, the central monitoring system 82 is coupled to the cloud 1312. A cloud server 1314 may interface with data from the cloud 1312. The central monitoring system 82 may store and display customer data and communicate with a web-based dashboard 1316 on a display 1318. In the system, a plurality of central monitoring systems 82 may be provided.

A web-based administrator interface 1330 may be used to control and provide services to the central monitoring systems 82 and the user devices 80. Applications 1332, services 1334 may be communicated to the user devices 80 and the central monitoring systems 82. An application interface (API) 1336 allows the user devices 80 and the central monitoring systems 82 to communicate with the web-based administrator interface 1330. Applications 1332, services 1334 and an application interface (API) 1336 may be incorporated into a server 1340.

The web-based administrator interface 1330 may include a display 1342 for displaying data from the applications 1332 of the user devices 80, services 1334 and the central monitoring systems 82 that are received through the application interface (API) 1336.

Web-based administrator interface 1330 may be a high level overall system supervisor provided by companies. Other lower level companies may individually operate a central monitoring system 82. The central monitoring systems 82 may each be franchisees for a geographic region that operate under the operator of the web-based administrator interface. This way, the operators of the central monitoring systems may easily dispatch local technicians.

Figure 14:
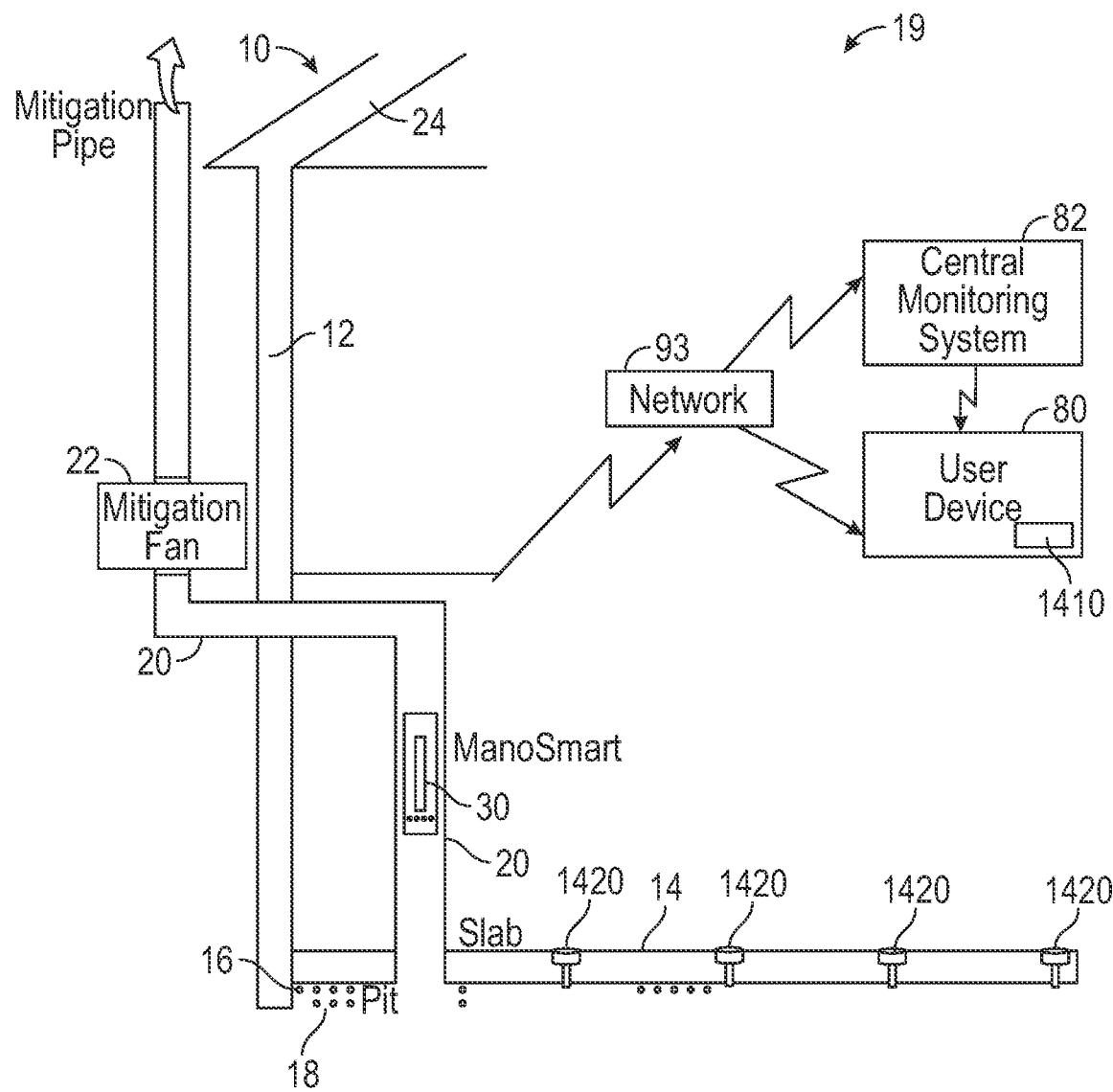
FIG. 14 is a schematic view of a building having a monitoring system with sub-slab sensors.

Referring now to FIG. 14, the mitigation fan or exhaust fan 22 is illustrated in the exhaust pipe 20 of the mitigation system 19. A monitoring system 30 is illustrated coupled to the exhaust pipe 20. The monitoring system 30 may perform the functions and be configured in a similar manner to that illustrated above with respect to FIG. 2. In this example, the monitoring system 30 is located at or near the exhaust pipe 20 and through the use of the pressure sensor 62 determines the pressure within the exhaust pipe 20. The exhaust pipe 20, through the use of the mitigation fan 22, draws air from sub-slab area 16. As mentioned above, soil or stone 18 may be disposed in the sub-slab area 16. In this example, the wireless interface 78 is illustrated in FIG. 2. The network 93 also communicates with the central monitoring system 82 and the user device 80 has an application 1410 (app) used for performing various functions including comparing various thresholds and displaying data to a user. The app 1410 may also be used to control various functions at the controller 60 of the mounting device 30 such as resetting an alarm circuit.

The system illustrated above is improved by providing at least one sub-slab sensor assembly 1420. In this example, four sub-slab sensor assemblies 1420 are illustrated spaced apart. However, various numbers of sub-slab sensors may be used. The sub-slab sensors, in general, are used to measure conditions in the sub-slab area 16. In general, the sub-slab sensor assemblies 1420 are used to measure one or more of the sub-slab pressures, the sub-slab air quality and the above floor air quality. In addition, each of the sub-slab sensor assemblies 1420 may have a position sensor to provide a position relative to the building. The sub-slab sensor assemblies 1420 may communicate through the network 93 to the monitoring system 30 which may then communicate through the network 93 to the central monitoring system 82 or the user device 80, or both. It should be noted that a short range wireless communication, such as Bluetooth, may be used to communicate between the sub-slab sensor assemblies 1420 and the monitoring device 30 as described in greater detail below.

Figures 15A, 15B:
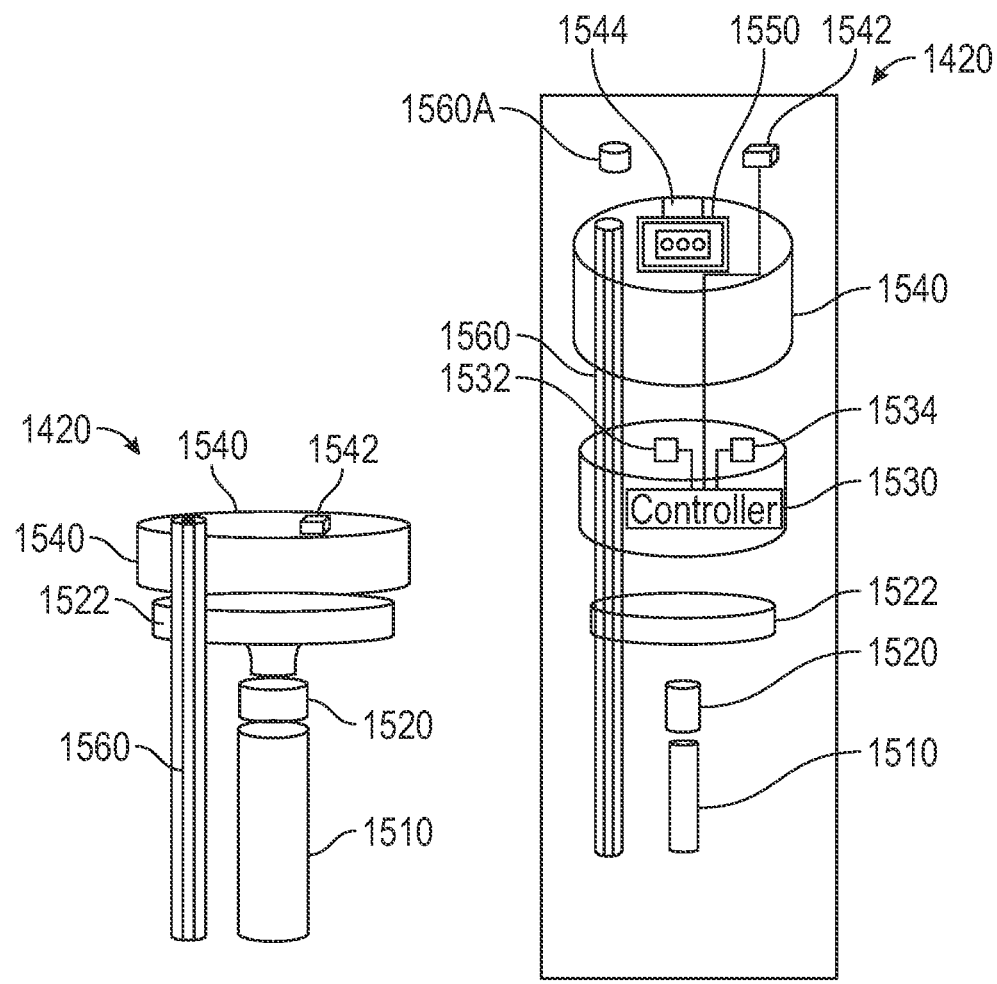
FIG. 15A is a side view of a sub-slab sensor.
FIG. 15B is an exploded view of the sub-slab sensor.
Figure 15C:
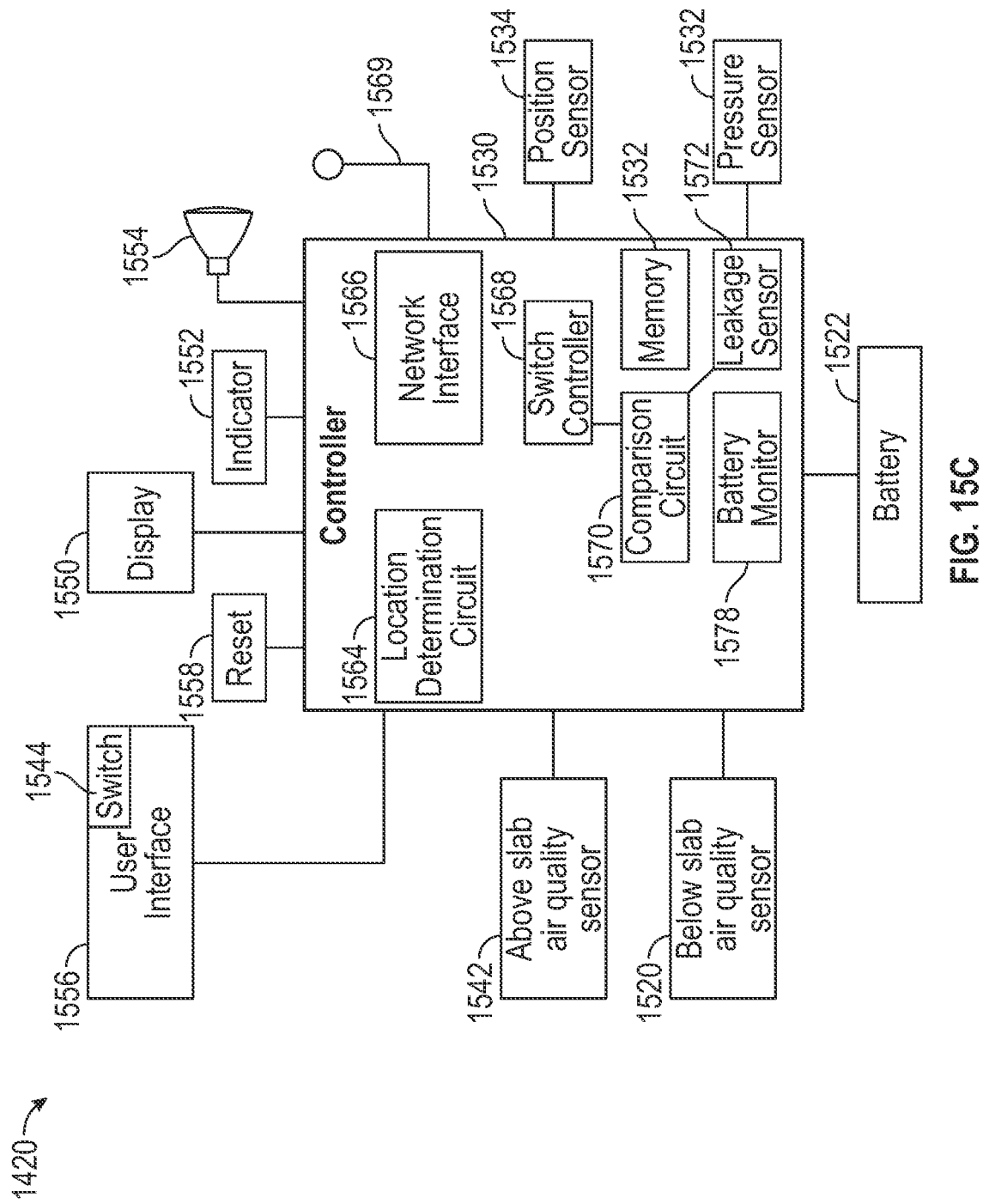
FIG. 15C is block diagrammatic view of one example of a sub-slab sensor.

Referring now to FIGS. 15A, 15B and 15C, the sub-slab sensor assembly 1420 is illustrated in further detail. In FIG. 15A, the sub-slab sensor assembly 1420 has an air tube 1510 that is hollow and communicates air from the sub-slab area 16 to an air quality sensor 1520. The air quality sensor 1520 may be a single sensor or a plurality of sensors that are used to detect undesirable gases or elements. The chemicals can be of different classes including but not limited to volatile organic compounds (VOCs), methane, PFAS, Trichloroethylene (TCE) certain semi-volatile organic compounds (SVOCs) and inorganic chemicals, such as elemental mercury, polycyclic aromatic hydrocarbons (PAHs), naturally occurring radon, and hydrogen sulfide.

The sub-slab sensor assembly 1420 also includes a power source such as lithium battery 1522. The battery 1522 is used to power a controller 1530. The controller 1530 may be microprocessor-based and has a non-transitory memory 1532 programmed to perform various functions as described in greater detail. The controller 1530 is also in communication with a pressure sensor 1532. The pressure sensor 1532 determines the pressure in the sub-slab area 16. The pressure sensor 1532 is in communication with the air tube 1510 so that air from under the slab is communicated therethrough. As described in greater detail elsewhere, it is desired to have negative pressure beneath the slab so that any contaminated gases are removed by the mitigation fan 22.

A position sensor 1534 is used to determine the position within the building. The position sensor 1534 may provide an identifier that corresponds to the sensor as well as the location relative to the building. The location may be the identifier, if desired. The position sensor 1534 may determine the position within the building by various techniques including triangulation techniques using the signal strengths of the Wi-Fi signals, cellular signals, GPS signals or the like. The location may be alpha numerical designations assigned during set up like "storage room." A housing 1540 may be in communication with the air tube 1510 and is coupled to and has therein the air quality sensor 1520, the battery 1522, the controller 1530, the pressure sensor 1532, the position sensor 1534. The housing 1540 may also include a second air quality sensor 1542. The air quality sensor 1542 is used to generate signals corresponding to the air quality above the slab. A switch 1544 may be a single switch or a plurality of switches or buttons that act as a user interface for inputting data, selecting functions, changing the display and the like. The switch 1544 may be used to change the display to display the air quality alternatively between the sub-slab area and the above slab area.

A display 1515 may be used to display an indictor 1552 as a visual indicator or generate an audible indicator through the audible indicator 1554.

An air sample access port 1560 may also be provided. The air sample access port 1560 extends through the housing 1540 to the sub-slab area. This allows a technician to open a cap 1560A and place a probe into the sub-slab area to verify the operation and accuracy of the air quality sensor 1520.

The housing 1540 has a user interface 1556 that may be one or more buttons used for programming, selecting a display or the like. The switch 1544 may be part of the user interface 1556. The user interface 1556 may be accessible on the top surface of the housing 1540. A reset 1558 may also be provided on the housing 1540 and in communication with the controller 1530. The reset 1558 may be used to reset an alarm or one or more of the indicators 1552, 1554. It should be noted that the user interface 1556 and the reset 1558 may be combined in various examples.

Referring now specifically to FIG. 15C, details of the controller 1530 are set forth. The controller 1530 is programmed to perform various functions. For example, the controller 1530 has a location determination circuit 1564. The location determination circuit 1564 may receive external signals such as cellular phone signals, GPS satellite signals, Wi-Fi signals and the like. The location determination circuit 1564 may use triangulation to determine the relative location of the sensor within the building.

The controller also has a network interface 1566. The network interface 1566 may be coupled to an antenna 1569 that is used to transmit signals from the controller to the monitoring device 30 or to the router 92 or through the network 93. Of course, the network interface 1566 may be capable of communicating with more than one type of network. Data signals and warning signals are examples of signals that are communicated from the network interface 1566. A switch controller 1568, in communication with the switch 1544, may allow switching between the above slab air quality sensor 1542 and the below slab air quality sensor 1520. The switch controller 1568 may switch the data from being communicated to a comparison circuit 1570. The comparison circuit 1570 compares the signals from the air quality sensors 1542, 1520 to acceptable exposure limits of the chemicals being sensed. The comparison circuit 1570 may also be in communication with a leakage sensor 1572. That is, by monitoring the above slab air quality signals from the above slab air quality sensor 1542 and the below slab air quality sensor 1520, leakage of a seal around the housing 1540 may be determined. That is, when leakage occurs from around the housing 1540 from below the slab to above the slab 14, the above slab air quality sensor 1542 will sense a change in the air quality and therefore may generate a warning signal on the display 1550, the indicator 1552, or the audible indicator 1554. A warning signal may also be communicated through the network interface 1566 to the monitoring device 30. The service provider may therefore communicate with a technician and dispatch a technician to fix the sensor. The warning signal through the network interface 1566 may provide a sensor identifier identifying the sensor and the location of the sensor within the building that is required to be serviced.

A battery monitor circuit 1578 may also be provided within the controller 1530. The battery monitor circuit 1578 may detect when the battery within the sub-slab sensor is running low and requires changing. The network interface 1566 may generate a battery signal that includes an identifier of the sensor and/or the location of the sensor requiring battery change to the monitoring device 30 and to a central monitoring system 82 or a user device 80 in which a screen display may generate a warning signal. Likewise, a notification may also be provided at the app 1410 of the user device 80 which may be audible, visual or combinations of both.

Figures 16A, 16B:
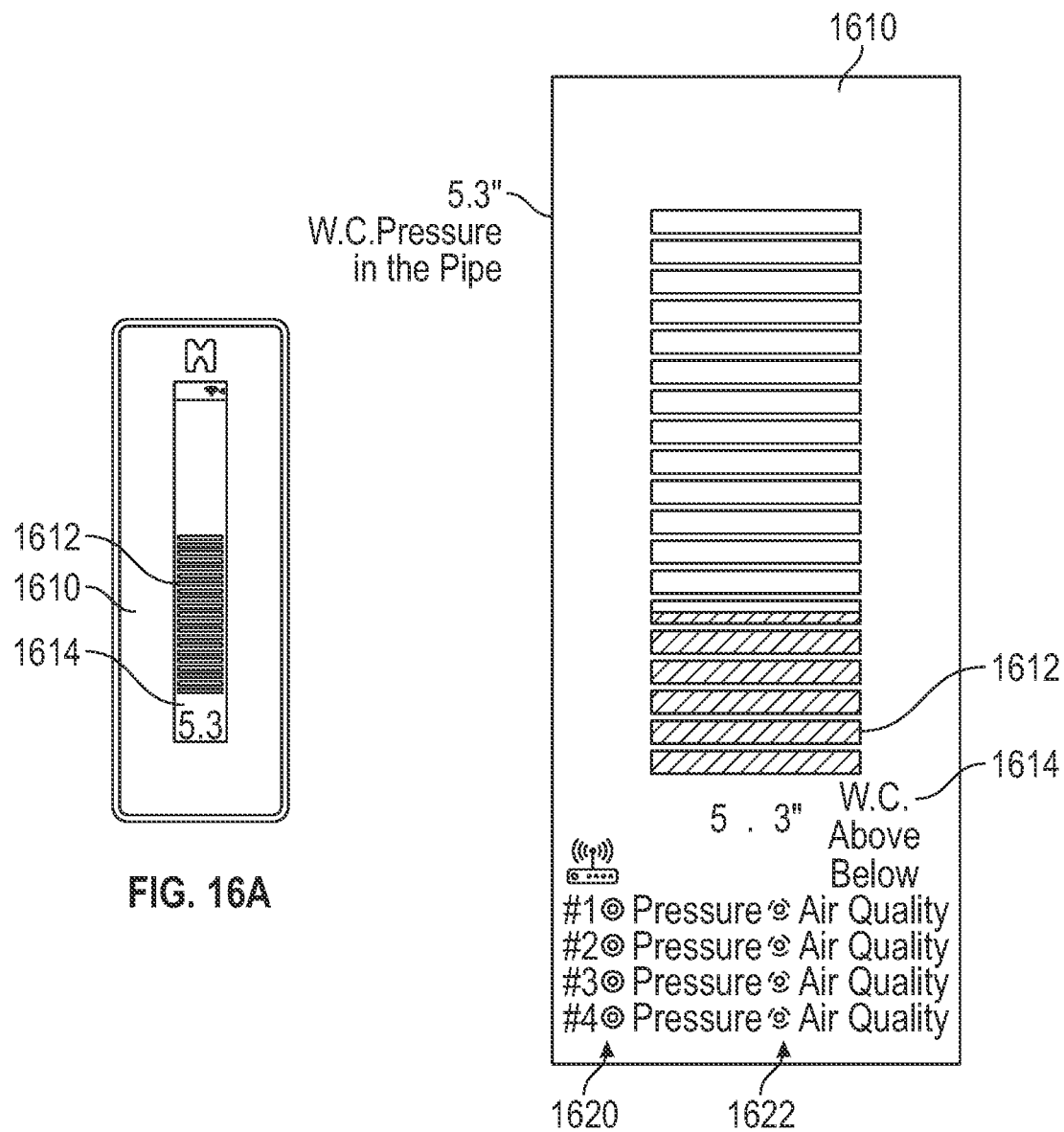
FIG. 16A is an example view of a display of a monitoring system.
FIG. 16B is a more detailed view of the monitoring system display of FIG. 16A.

Referring now to FIGS. 16A and 16B, a display 1610 is illustrated for the monitoring device 30. The monitoring device 30 may have various types of displays depending upon the capability. In FIG. 16A, a bar graph 1612 is provided using a liquid crystal display that illustrates the relative intensity of the signal being measured and a numeral value 1614 corresponding to the bar graph 1612. In FIG. 16B, the bar graph is illustrated with a pressure. However, indicators 1620, 1622 illustrate four different pressures in air quality. By illuminating one of the indicators 1620, 1622, the corresponding amount may be displayed in the bar graph 1612 and on the numerical display 1614. That is, the controller 60 of the monitoring device uses the display circuit 60E illustrated in FIG. 2 to control the display. An example of displaying includes displaying the pressure sensed at the first sub-slab pressure sensor. Thereafter, the air quality of the sub-slab sensor may be generated. Both the above air quality and the below air quality sensor signals may be displayed either simultaneously or alternatively. Thereafter, the pressures and air qualities of the sub-slab sensors may be generated. The indicator 1620 may thus alternate between the various indicators 1620, 1622 to inform the user as to which sensor data is being displayed. The generation of warnings at the controller 60 relative to the sensing system including sub-slab sensors is provided. Likewise, generating voltage warnings is described in FIG. 9. The display of chemical concentration and warning statuses as used by the comparison circuit within either the controller 1530 or the controller 60 may be performed. That is, the various warnings may be generated at the sensor and communicated to the monitoring system 30 as a warning signal. Likewise, the raw data may also be communicated from the sub-slab sensor assemblies 1420 to the monitoring system 30 and compared in the comparison circuit 60B when then the warning signals are generated. Likewise, the raw data may also be communicated to the network 93 to the central monitoring system 82 where a comparison circuit may generate warnings signals to a central operator so that the service personnel may be dispatched. Likewise, the user device 80 may be communicated with and therefore the application 1410 may perform the comparison similar to that of the comparison circuit 60B. Thus, the floor sensor assemblies 1420 may generate and communicate warning signals and/or the raw data to one or more of the monitoring system 30, the central monitoring system 82 or the user device 80.

During operation of the floor sensors, the access port 1560 may be sealed by the cap 1560A. However, governmental regulations may require verification of the signals sampled by the air quality sensor 1520. Therefore, the cap 1560A may be removed and concentrations may be manually monitored.

Figure 17:
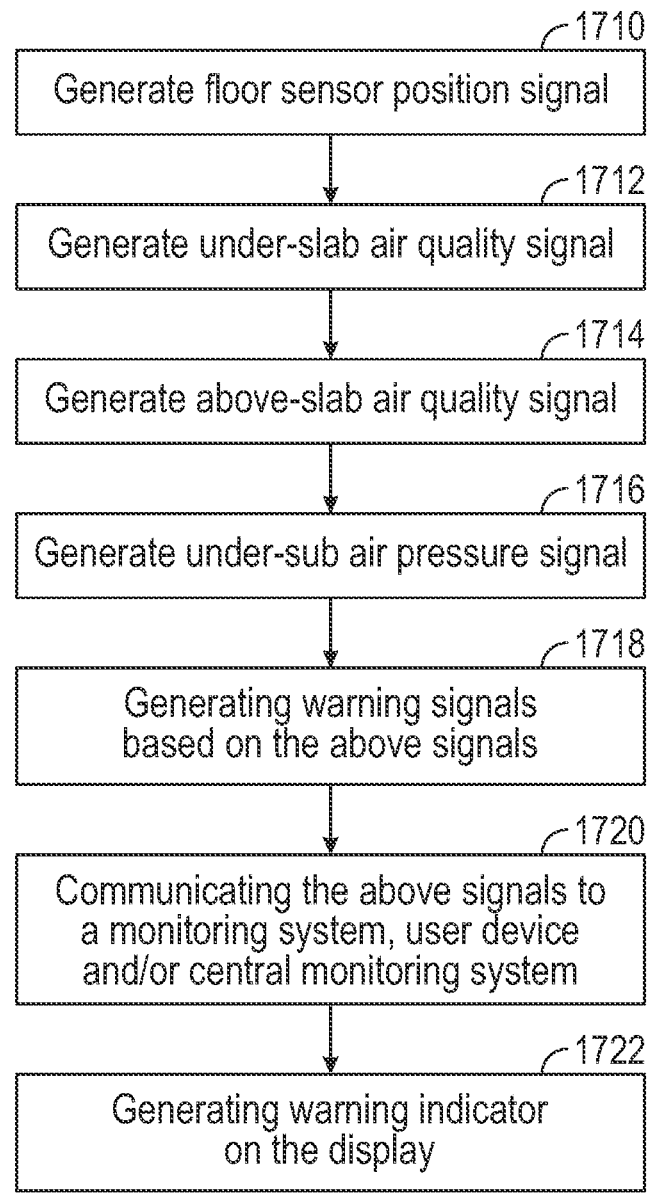
FIG. 17 is a flowchart of a method for operating the system having sub-slab sensors.

Referring now to FIG. 17, a method for operating the sub-slab sensor 1420 is set forth. In step 1710, the floor sensor position signal is generated by the position sensor 1534. In step 1712, the under slab air quality signal is generated by the air quality sensor 1520. In step 1514, the above slab air quality signal is generated by the air quality sensor 1542 if present. As mentioned above, the air quality sensor 1520 may be used for dual purposes for both above and below slab monitoring.

In step 1716, the under slab air pressure signal is generated. The under slab air pressure signal is typically lower than the above slab air pressure so that containments are withdrawn by the exhaust fan 22 as described above. In step 1718, warning signals may be generated based upon the above monitored signals. The warning signals are generated by comparing the signals to acceptable thresholds. The warning signals may be generated at the sub-slab sensors, the monitoring system 30, the central monitoring system 82 and the app 1410 of the user device 80. As mentioned above, warning signals and/or data may be communicated to the various devices for comparison or may be compared within the sub floor sensor. The warning signals may also be based on comparing the data over time. That is, historic data may be saved within one of the memories including the memory 1532 where changes over time may be monitored. Changes over time may be required to be monitored by certain governmental agencies. The communicating of the signals from steps 1710 through 1718 may be communicated at step 1720 using wireless communication. The wireless communication may be performed directly to the central monitoring system or the user device 80 through the network 93. Likewise, indirect communication may also be performed from the sub-slab sensor assemblies 1420 to the monitoring system 30 wherein the signals, such as warning signals or data signals, are communicated through the network 93 to the central monitoring system 82 and to the user device 80 where they are consumed within the app 1410. In step 1722, a warning indicator may be generated on the display. The display may be the display 1610, the display 74 in FIG. 2 or a display associated with the central monitoring system 82 or the user device 80. One example of a central monitoring system display is illustrated in FIG. 13.

Figures 18A, 18B:
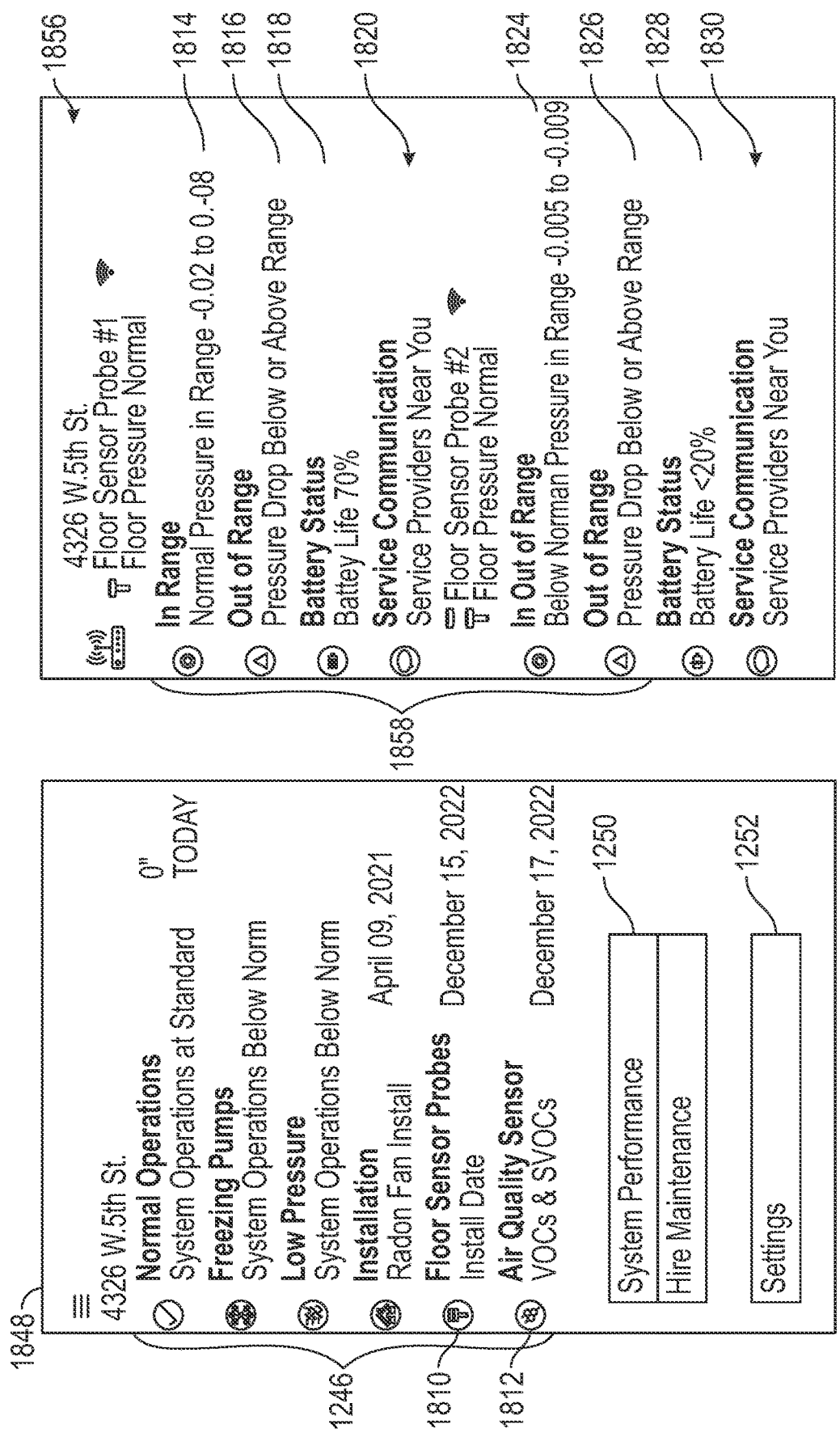
FIG. 18A is a screen display displayed at an app for various information associated with the system including the sub-slab probe sensors.
FIG. 18B is a display of sub-slab sensor data.

FIG. 18A generally corresponds to FIG. 12D and therefore the same components will not be described in further detail. In addition to that set forth in FIG. 12D, the floor sensor probe data 1810 may be displayed. In this example, the sub-slab sensor probe installation date is displayed. Likewise, the air quality sensors, both above the slab and below the slab, may be generated by the display 1812.

Referring now to FIG. 18B, a pressure indicator 1814 is generated when the sub-slab sensors indicate the pressures are normal. The display may be generated for each of the sensors (probes). In this example, the first probe signals are generated. An out-of-range display 1816 may be generated when the pressure sensor drops to below the range or above the range of pressures set forth as normal. In the display 1818, a battery life indicator may also be displayed. A selector 1820 may be generated for selecting service providers to provide service for the sub-slab sensor. A monitoring sensor identifier is illustrated as "Floor sensor probe #2." Displays 1824, 1826, 1828 and 1830 are similar to those displayed as 1814-1820 in that the inner out of range pressure is displayed, whether an out-of-range pressure has been displayed, the battery status and service providers are generated respectively at 1824-1830.

Figure 18C:
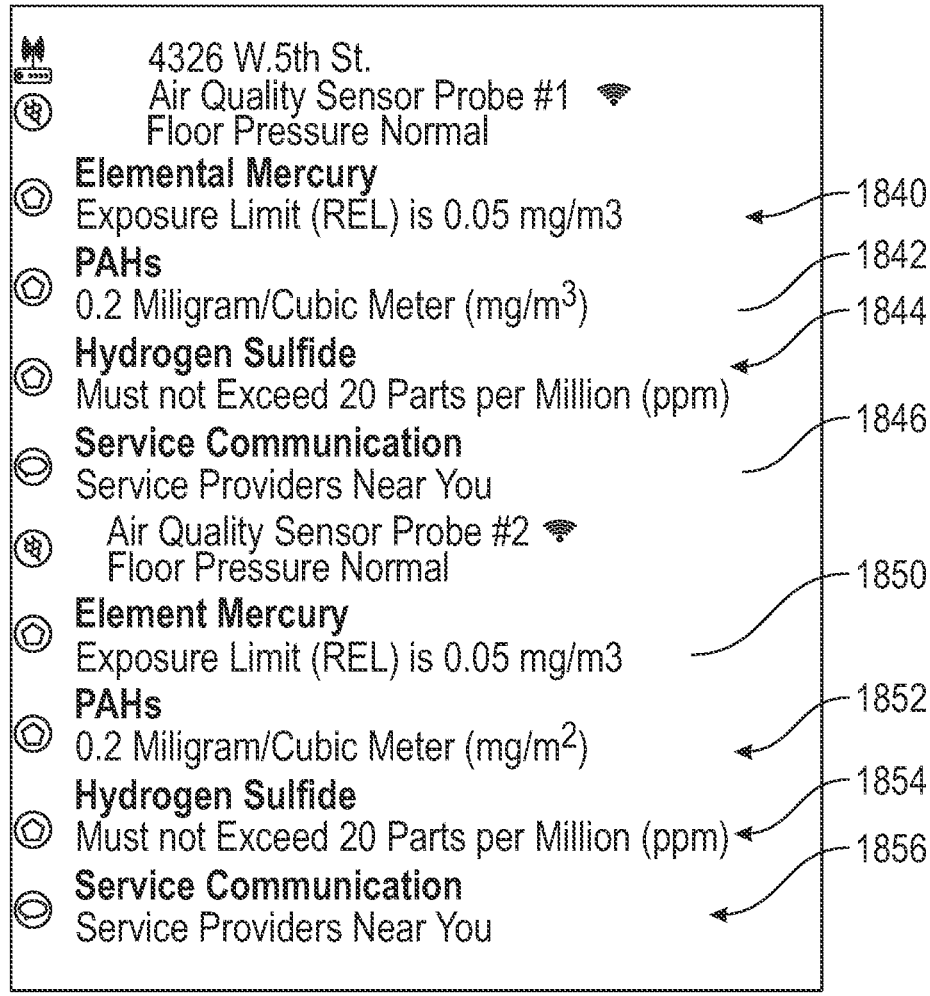
FIG. 18C is an application display illustrating various air qualities of sub-slab sensors.

The status of the air quality sensors may be displayed in the display illustrated in FIG. 18C. An elemental mercury display 1840, a PAH display 1842, a hydrogen sulfide display 1844 and a service communication display 1846 are all set forth. The level of elemental mercury is displayed at 1840, the polycyclic aromatic hydrocarbons (PAH) are displayed at 1842 and the amount of hydrogen sulfide is displayed at 1844 for the first sub-slab sensor. As indicated above in FIGS. 18A and 18B, a list of service providers may be provided by selecting the display 1846.

Different air quality signals may also be displayed as chemical indicators. That is, an elemental mercury display 1850, a PAH display 1852, a hydrosulfide 1854 and a service communication display 1856 may all be generated as described above. It should be noted that the air quality sensors may also generate other types of sensor signals that all may be displayed depending upon the governmental requirements and the suspected contaminates in an area. Radon is one example of another type of air quality that may be displayed. Likewise, further types of air quality signals from an air quality sensor were described above relative to FIGS. 15A and 15B.

Figure 19:
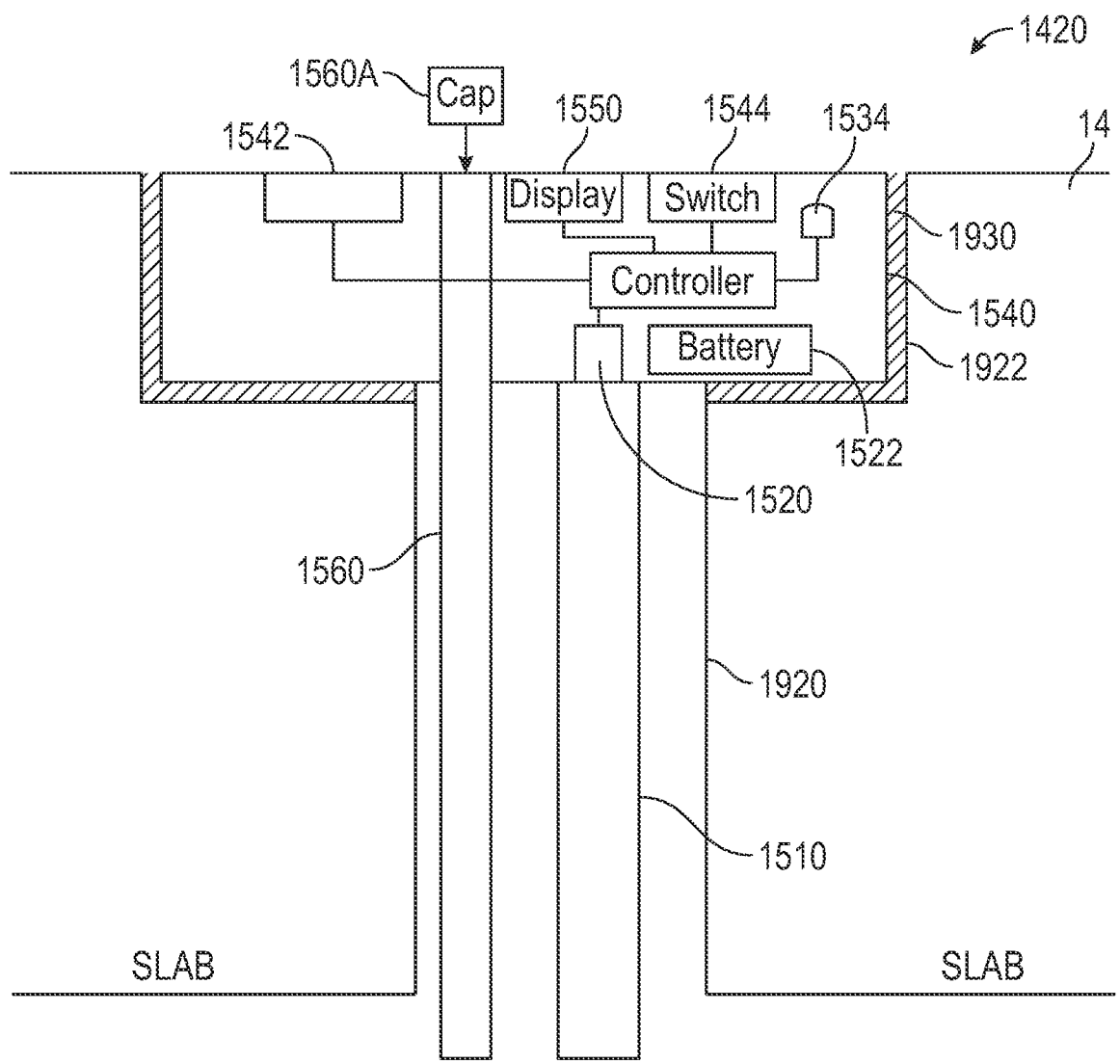
FIG. 19 is a side cutaway view of a sensor installed within a slab.

Referring now to FIG. 19, the sub-slab sensor assembly 1420 is illustrated within the slab 14. The slab 14, in this example, has a bore 1910 drilled therethrough. The bore 1920 extends from the top surface of the slab to the bottom surface of the slab. The bore 1920 has a first diameter. A second bore 1922 having a second diameter greater than the first diameter. The second diameter of the second bore 1922 is just larger than the diameter of the housing 1540. During the installation of the sensor, the first bore 1920 and the second bore 1922 are drilled. The ordering of the drilling of the bores is unimportant. To prevent gas leakage from around the sensor housing 1540, a seal 1930 may be disposed between the housing 1540 and the bore 1922. Seal material may include silicone or other materials that will not break down when exposed to contamination from under the slab 14.

Figure 20:
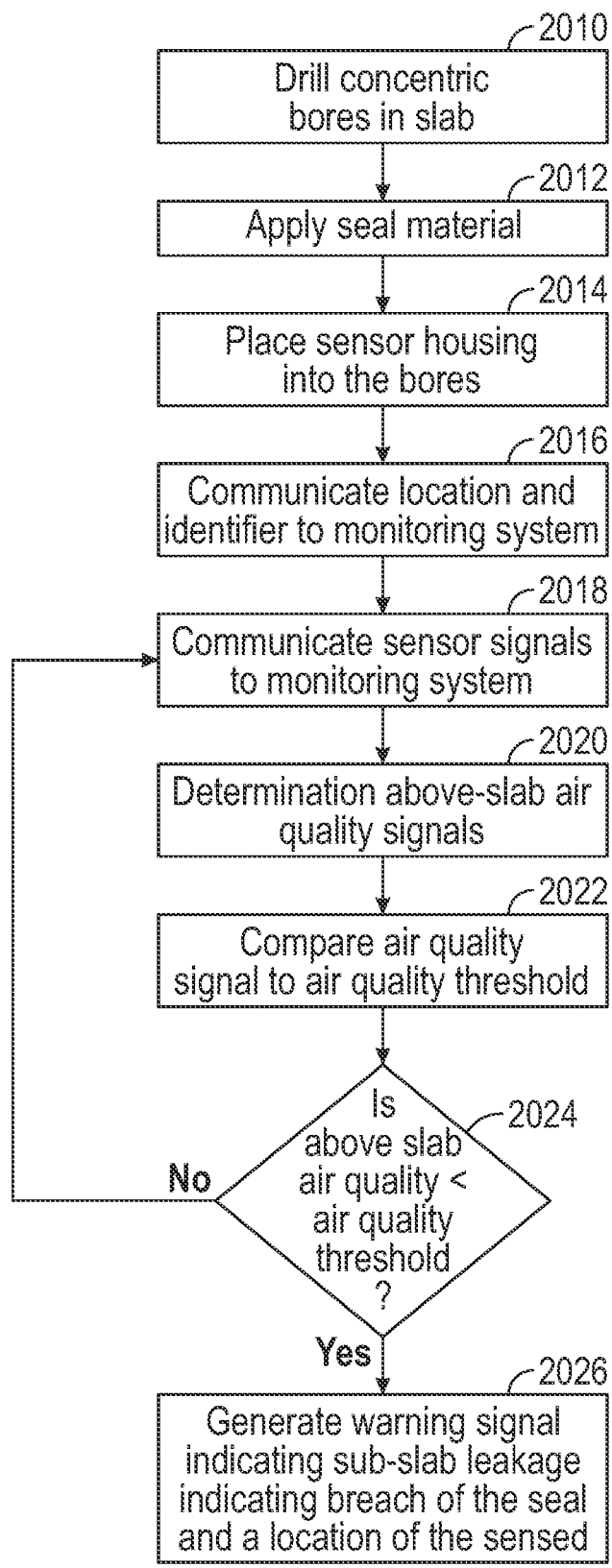
FIG. 20 is a method for installing the sensor and monitoring for an improper seal.

Referring now to FIG. 20, a method for installing the sub-slab sensor and determining whether the is sub-slab leakage when a seal is breached is set forth. In step 2010, two concentric bores are drilled in the slab. The smaller diameter bore is drilled all the way through the slab while the larger diameter slab is merely countersunk a predetermined distance below the surface. In step 2012, seal material is applied to the bores and/or the housing of the sub-slab sensor. In step 2014, the sensor housing is placed into the bores. That is, the tube 1510 and the sample access port 1560 are placed into the through bore while the housing rests within the wider diameter bore supported by the slab.

In step 2016, the location and an identifier for the sub-slab sensor is communicated to the monitoring system. The monitoring system may be the monitoring system 30 or the central monitoring system 82. Likewise, the user device 80 may also be considered a monitoring system. In step 2018, the sensor signals corresponding to the various sensors associated with the sub-slab sensor are communicated to the monitoring system. The air quality above and below the slab as well as the location and the below slab pressure are communicated to the monitoring system. In step 2020, the above slab air quality is determined. The above slab air quality is compared to an air quality threshold in step 2022. In step 2024, when the air quality indicated by the air quality signals from the sensors are compared to the air quality threshold and are below the threshold, step 2026 generates a warning signal indicating leakage of the seal. In step 2024, when the air quality is above the air quality threshold, the monitoring system repeats in step 2018. The warning signal generated in step 2026 may be communicated to one or more of the monitoring systems including the user device 80 and the app 1410 disposed therein. A location of the sensor indicating low air quality and a leak in the seal may be provided. Service personnel may be dispatched to replace the seal and/or the sensor should replacement be needed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sub-slab sensor assembly for a building having a slab comprising:
    a housing;
    a first air quality sensor coupled to the housing and generating a first air quality signal for air above the slab;
    a second air quality sensor coupled to the housing and generating a second air quality signal for air below the slab;

a pressure sensor coupled to the housing, said pressure sensor generating a pressure signal corresponding to the pressure below the slab;

a position sensor generating a position signal corresponding to a location of the sensor; and a network interface communicating the first air quality signal, the second air quality signal or the pressure signal or warning signals corresponding thereto and the position signal to a network.

2. The sub-slab sensor assembly of claim 1 further comprising a controller coupled to the first air quality sensor, the second air quality sensor, the pressure sensor programmed to compare the pressure signal to a threshold and programmed to generate an indicator based on comparing.

3. The sub-slab sensor assembly of claim 2 wherein the indicator comprises an audible indicator, a visual indicator or both.

4. The sub-slab sensor assembly of claim 1 further comprising a display displaying the indicator corresponding to the pressure, said housing coupled to the display.

5. The sub-slab sensor assembly of claim 1 wherein the housing comprises a first portion having a first diameter greater than a second diameter of an air tube coupled to the housing adjacent to the pressure sensor and first air quality sensor.

6. The sub-slab sensor assembly of claim 1 further comprising a sampling port coupled to the housing communicating air from below the slab to above the slab.

7. The sub-slab sensor assembly of claim 6 wherein the sampling port comprises a removable cap.

8. The sub-slab sensor assembly of claim 1 further comprising a reset button coupled to the housing, said reset button resetting the audible indicator.

9. The sub-slab sensor assembly of claim 1 further comprising generating a warning signal for sub-slab leakage detected by the first air quality sensor.

10. A monitoring system comprising:
the sub-slab sensor assembly of claim 1;
a controller located remotely from the sub-slab sensor assembly and
receiving the first air quality signal, the second air quality signal, the pressure signal and the position signal from the network.

11. The system of claim 10 wherein the controller is coupled to a display displaying an indicator based on at least one of the first air quality signal, the second air quality signal and the pressure signal.

12. The system of claim 10 wherein the controller is programmed to compare the pressure signal to a first threshold and a second threshold, said controller generates a low pressure indicator when the pressure signal is below the first threshold and a high pressure indicator when the pressure signal is greater than the second threshold.

13. The system of claim 10 further comprising a wireless interface communicating an indicator to a user device, said user device displaying the indicator.

14. The system of claim 13 wherein the wireless interface communicates the pressure signal to the user device and the user device displays a high-pressure indicator or low pressure indicator corresponding to the pressure signal.

15. The system of claim 10 wherein the air quality sensor comprises a chemical concentration sensor generating a chemical concentration signal, said controller generating a chemical indicator signal when the chemical concentration signal is greater than a chemical threshold.

16. The system of claim 10 wherein the controller is coupled to a central monitoring system through a network said central monitoring system generates a warning signal when the pressure signal is not received after a predetermined time from a previous pressure signal.

17. The system of claim 16 wherein the controller is coupled to a user device application through a network and the user device generates a display comprising a monitoring sensor identifier and at least one of a pressure indicator or an air quality indicator.

18. A method of operating a sub-slab monitoring system comprising:
generating a first air quality signal for air above the slab from a first air quality sensor coupled to a housing;
generating a second air quality signal for air below the slab from a second air quality sensor coupled to the housing;
generating a pressure signal corresponding to the air pressure below the slab;
generating a position signal corresponding to a location of the housing; and
communicating the first air quality signal, the second air quality signal, the pressure signal and the position signal to a network through a network interface.

19. The method of claim 18 further comprising inserting the housing into a bore through a slab.

20. The method of claim 19 further comprising determining a leak in a seal between the bore and the housing using the first air quality sensor and generating a warning signal corresponding to the leak.

21. The method of claim 19 further comprising communicating a location of the leak.

* * * * *